(12) United States Patent
Mortada et al.

(10) Patent No.: US 8,922,787 B2
(45) Date of Patent: Dec. 30, 2014

(54) SPATIAL SPLITTING-BASED OPTICAL MEMS INTERFEROMETERS

(71) Applicants: Bassem Mortada, Cairo (EG); Diaa Abdel Maged Khalil, Cairo (EG); Bassam A. Saadany, Cairo (EG)

(72) Inventors: Bassem Mortada, Cairo (EG); Diaa Abdel Maged Khalil, Cairo (EG); Bassam A. Saadany, Cairo (EG)

(73) Assignee: Si-Ware Systems, Cairo (EG)

( * ) Notice: Subject to any disclaimer, the term of this patent is extended or adjusted under 35 U.S.C. 154(b) by 157 days.

(21) Appl. No.: 13/758,580

(22) Filed: Feb. 4, 2013

(65) Prior Publication Data

US 2014/0192365 A1 Jul. 10, 2014

Related U.S. Application Data

(60) Provisional application No. 61/749,835, filed on Jan. 7, 2013.

(51) Int. Cl.

| | |
|---|---|
| *G01B 9/02* | (2006.01) |
| *G02B 26/08* | (2006.01) |
| *G02B 27/16* | (2006.01) |
| *G02B 27/14* | (2006.01) |
| *G01J 3/02* | (2006.01) |
| *G01J 9/02* | (2006.01) |

(52) U.S. Cl.
CPC ........ *G01B 9/02015* (2013.01); *G01B 9/02051* (2013.01); *G02B 26/0833* (2013.01); *G02B 27/16* (2013.01); *G02B 27/14* (2013.01); *G01B 9/02091* (2013.01); *G02B 27/143* (2013.01); *G01J 3/021* (2013.01); *G01J 9/02* (2013.01)
USPC ....................................... 356/521

(58) Field of Classification Search
CPC ............ G01B 9/02; G01J 9/02; G01J 9/0215; G03F 7/706; G01M 11/0271
USPC ........................................ 356/521
See application file for complete search history.

(56) References Cited

U.S. PATENT DOCUMENTS

| | | |
|---|---|---|
| 5,410,625 A | 4/1995 | Jenkins et al. |
| 2005/0089262 A1 | 4/2005 | Jenkins et al. |
| 2008/0080034 A1 | 4/2008 | Saadany et al. |
| 2008/0204879 A1 | 8/2008 | Manzardo et al. |
| 2011/0058180 A1 | 3/2011 | Khalil et al. |

FOREIGN PATENT DOCUMENTS

| | | |
|---|---|---|
| WO | 9930196 | 6/1999 |
| WO | 2011/031791 A1 | 3/2011 |

OTHER PUBLICATIONS

Kareem Khirallah,Spatial beam splitting for fully integrated MEMS interferometer,2013, vol. 8616,86160O.*

Manzardo et al., "Miniaturized time-scanning Fourier transform spectrometer based on silicon technology," Optics Letters, vol. 24, No. 23, Dec. 1, 1999, pp. 1705-1707.

(Continued)

*Primary Examiner* — Tarifur Chowdhury
*Assistant Examiner* — M D Rahman
(74) *Attorney, Agent, or Firm* — Garlick & Markison; Holly L. Rudnick

(57) ABSTRACT

A spatial splitting-based optical Micro Electro-Mechanical Systems (MEMS) Interferometer includes a spatial splitter for spatially splitting an input beam into two interferometer beams and a spatial combiner for spatially combining the two interferometer beams. A MEMS moveable mirror is provided to produce an optical path difference between the first interferometer beam and the second interferometer beam.

31 Claims, 22 Drawing Sheets

(56) References Cited

OTHER PUBLICATIONS

Krippner et al., "Microspectrometer for the infrared range," SPIE vol. 2783, 1996, pp. 277-282.

Schildkraut et al., "A MEMS based absorption micro-spectrometer for toxic vapor detection and identification," Presented at the Scientific Conference on Chemical and Biological Defense Research (2004) held in Hunt Valley, Maryland, on Nov. 15-17, 2004, 8 pages.

Solf et al., "Miniaturized LIGA Fourier Transformation Spectrometer," Sensors 2003, Proceedings of IEEE 2, 773-776 (2003).

Yu et al., "Micromachined Fourier transform spectrometer on silicon optical bench platform," Sensors and Actuators A 130-131, 2006, pp. 523-530.

Krippner et al., "Microspectrometer System for the Near Infrared Wavelength Range based on the LIGA Technology," Micro- and Nanotechnology for Biomedical and Environmental Applications, Proceedings of SPIE, vol. 3912 (2000), pp. 141-149.

Yu et al., "Chip-scale High-speed Fourier-transform Spectrometer Based on a Combination of a Michelson and a Fabry-Perot Interferometer," IEEE Sensors 2006, Oct. 22-25, 2006, pp. 412-415.

Saadany et al., "MEMS Tunable Michelson Interferometer with Robust Beam Splitting Architecture," IEEE Xplore, 2009, pp. 49-50.

Yu et al., "Micromachined Fourier Transform Spectrometer on Silicon Optical Bench Platform," IEEE, 13th Int'l Conference on Solid-State Sensors, Actuators and Microsystems, Jun. 5-9, 2005, pp. 1250-1254.

International Searching Authority; International Application No. PCT/US13/024714; Aug. 5, 2013; 11 pgs.

Manzardo, et al., "Miniaturized Time-Scanning Fourier Transform Spectrometer Based on Silicon Technology", Optics Letters, Optical Society of America; Dec. 1, 1999; vol. 24, No. 23, pp. 1705-1707.

* cited by examiner

SPATIAL SPLITTING-BASED OPTICAL MEMS INTERFEROMETERS

CROSS REFERENCE TO RELATED PATENTS

The present U.S. Utility patent application claims priority pursuant to 35 U.S.C. §119(e) to the following U.S. Provisional patent application(s) which are hereby incorporated herein by reference in their entirety and made part of the present U.S. Utility patent application for all purposes:
1. U.S. Provisional Application Ser. No. 61/749,835, entitled "Spatial Splitting-Based Optical MEMS Interferometers,", filed Jan. 7, 2013.

BACKGROUND OF THE INVENTION

1. Technical Field of the Invention

The present invention relates optical MEMS interferometers.

2. Description of Related Art

Micro Electro-Mechanical Systems (MEMS) technology, with its various actuation techniques, enables the realization of new functions and features of photonic devices. For example, by using MEMS actuation to control a movable mirror of an interferometer, displacements in the interferometer optical path length can be introduced, and consequently, a differential phase between the interfering beams can be obtained. The resulting differential phase can be used to measure the spectral response of the interferometer beam (e.g., using Fourier Transform Spectroscopy), sub-surface images of tissues (using Optical Coherence Tomography), the velocity of the moving mirror (e.g., using the Doppler Effect), or simply as an optical phase delay element.

MEMS interferometers are key elements in many sensor applications, such as optical spectrometers. MEMS interferometers have recently been developed using technologies such as surface micromachining, LIGA and Deep Reactive Ion Etching (DRIE) on Silicon on Insulator (SOI) wafers.

Most micromachined interferometers are based on a conventional beam splitting technique using reflection and transmission by a dielectric interface (beam splitter). The interferometer typically further includes fixed and movable metallic mirrors. When using DRIE on SOI wafers technology, MEMS micro-mirrors are formed by selective metallization of silicon side walls using a shadow mask sputtering technology. This metallization technique represents one of the main problems of micromachined interferometers, as it is required to leave a relatively large distance between the mirror and beam splitter. This distance results from a requirement of metallization of the mirror, while keeping the beam splitter dielectric surface protected from metal. Such a long optical propagation distance degrades interferometer performance, especially with limited SOI device height. In addition, absorption losses may be introduced in the near infrared and visible wavelength ranges due to propagation within the medium of the beam splitter.

Another problem encountered in micromachined interferometers is dispersion. As described above, in a MEMS based interferometer, the beam splitter may be a silicon wall or simply the air/silicon (or any other material) interface. In such structures, the optical beams traverse a silicon part in one arm, while the second arm is free from silicon (e.g., propagation in air only). As silicon (or any other equivalent material for the beam splitter) has a refractive index that varies with wavelength, a phase error may be introduced in the interferometer (a phase shift that is dependent on the wavelength). This problem may be addressed by adding compensating interfaces. However, adding such compensating dielectric interfaces may lead to more Fresnel loss if these interfaces are not anti-reflection coated. Anti-reflection coating is not an easy process in optical MEMS monolithic systems, such as those fabricated using DRIE of SOI wafers. Moreover, AR coating is not typically wideband enough for applications like FTIR Spectroscopy. Having many interfaces also leads to more scattering loss due to surface roughness of etched surfaces using DRIE. Therefore, there is a need for a more efficient micromachined interferometer.

SUMMARY OF THE INVENTION

Embodiments of the present invention provide optical Micro Electro-Mechanical Systems (MEMS) interferometer including a spatial splitter, spatial combiner, moveable mirror and MEMS actuator. The spatial splitter receives an input beam and spatially splits the input beam into first and second interferometer beams. The spatial combiner receives the first and second interferometer beams and spatially combines them to produce an output. Each of the input beam, the first and second interferometer beams and the output beam propagate within a propagation medium that is different from the spatial splitter medium and the spatial combiner medium. The moveable mirror receives one of the first and second interferometer beams and reflects the received beam towards the spatial combiner. The MEMS actuator is coupled to the moveable mirror to cause a displacement thereof to produce an optical path difference between the first interferometer beam and the second interferometer beam.

The spatial splitter may include, for example, a truncating splitter, a hollow Multi-Mode interference (MMI) waveguide, a slotted splitter or a Y-splitter. The spatial combiner may include, for example, a focusing element, a hollow MMI waveguide, a slotted combiner, a double slit combiner or a Y-combiner.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a spatial splitting-based optical MEMS Interferometer (SSB-MI) employs spatial splitting of the input beam and spatial combining of the two resulting interferometer beams to reduce absorption losses, propagation distances, dispersion effect and Fresnel losses.

Figure 1:
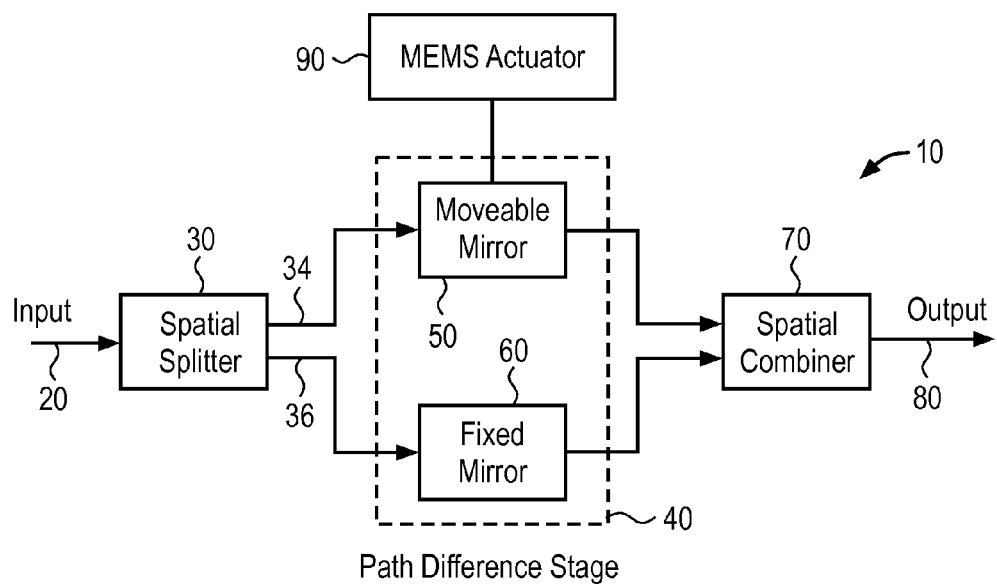
FIG. 1 illustrates an exemplary spatial splitting-based optical MEMS Interferometer (SSB-MI), in accordance with embodiments of the present invention.

Referring now to FIG. 1, there is illustrated an exemplary spatial splitting-based optical MEMS Interferometer (SSB-MI), in accordance with embodiments of the present invention. The SSB-MI 10 includes a spatial splitter 30, a path difference stage 40 and spatial combiner 70. The path difference stage 40 is optically coupled between the spatial splitter 30 and the spatial combiner 70 and provides two paths (interferometer arms) through which respective beams may travel between the spatial splitter 30 and spatial combiner 70.

In an exemplary operation, an input beam 20 incident on the spatial splitter 30 is spatially split into two interferometer beams 34 and 36, each directed towards a different interferometer arm within the path difference stage 40 of the SSB-MI. The input beam 20 may be produced by an infrared laser, visible laser, white source or any other type of optical source(s). After traversing the respective interferometer arm in the path difference stage 40, the two interferometer beams 34 and 36 are combined at spatial combiner 70 to produce an output 80 (i.e., interference pattern) that can be provided, for example, to an output fiber or detector.

In one embodiment, one of the interferometer arms includes a moveable mirror 50, while the other arm includes a fixed mirror 60. A MEMS actuator 90 is coupled to the moveable mirror 50 to cause a displacement in the position of the moveable mirror 50, thereby creating an optical path difference (OPD) between the interferometer beams 34 and 36 within the path difference stage 40. Each of the mirrors 50 and 60 may be, for example, metallic mirrors or non-metallic vertical Bragg mirrors. In other embodiments, the fixed mirror 60 may not be included in the path traversed by the second interferometer beam 36.

In an exemplary embodiment, the spatial splitter 30 produces the two interferometer beams 34 and 36 without either of the interferometer beams 34 and 36 propagating within the medium forming the spatial splitter 30. Since the interferometer beams 34 and 36 propagate in only one medium, which may be for example air or a vacuum, conventional absorption losses are eliminated. In addition, the spatial splitter 30 may be realized by a number of different configurations that provide reduced dispersion and Fresnel losses and may provide reduced propagation distances.

Different spatial splitter configurations will be discussed below, followed by a discussion of various spatial combiner configurations. Exemplary SSB-MI designs incorporating some of the spatial splitter and spatial combiner configurations will then be presented.

Figure 2A:
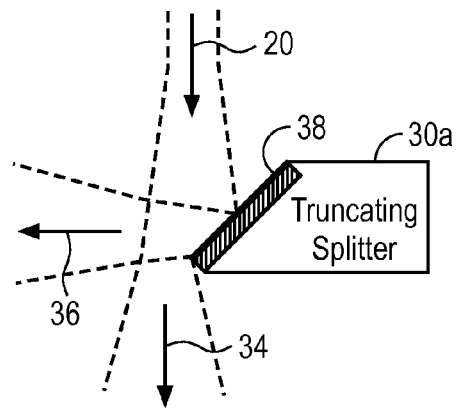
FIGS. 2A-2C illustrate exemplary spatial splitters for use within the SSB-MI, in accordance with embodiments of the present invention.
Figure 2B:
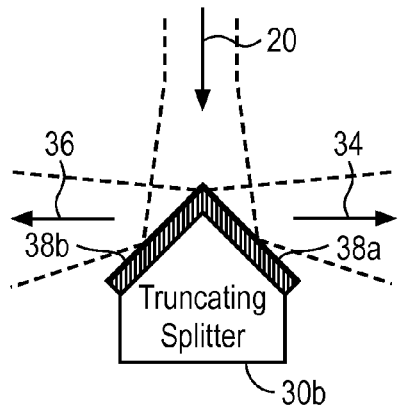
Figure 2C:
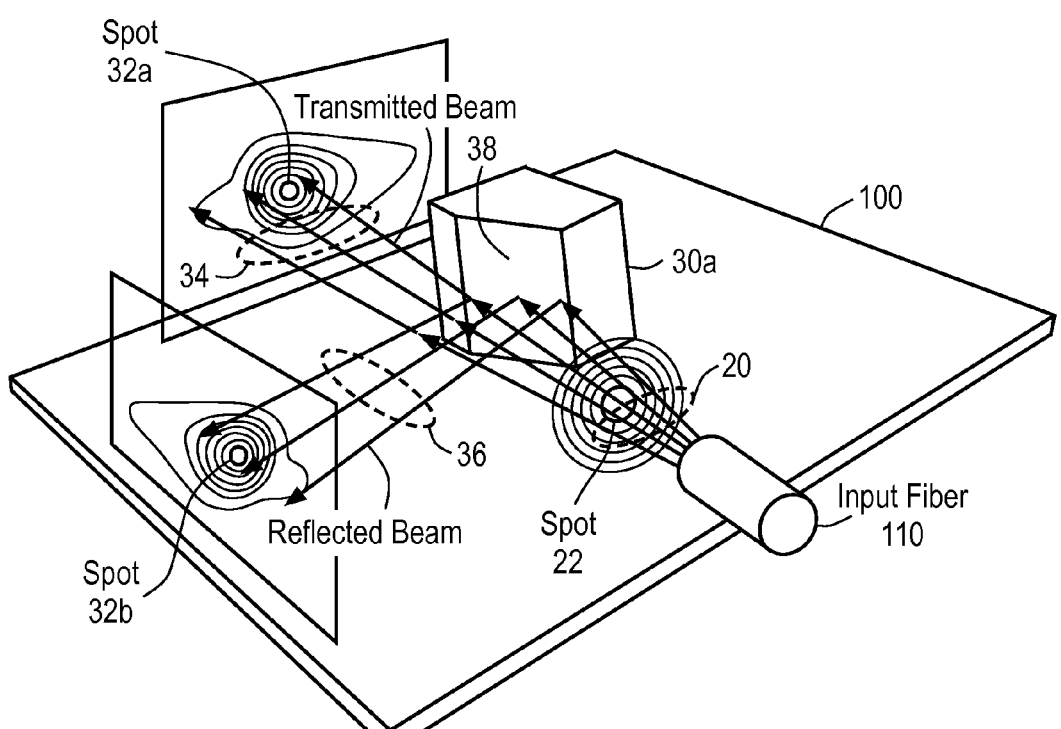

Referring now to FIGS. 2A-2C, various truncating splitter configurations are illustrated. For example, in FIG. 2A, a reflection/transmission-type truncating splitter 30a is shown in which a first portion of an input beam 20 propagates past the truncating splitter 30a without incidence on the truncating splitter 30a to form the first interferometer beam 34, while the other portion of the input beam 20 is reflected from a reflecting surface 38 of the truncating splitter 30a to form the second interferometer beam 36.

In the embodiment shown in FIG. 2A, the reflecting surface 38 is an inclined surface aligned to receive a portion of the input beam 20, thereby enabling the input beam 20 to be split into the two interferometer beams 34 and 36, and interferometer beam 36 to be reflected from the reflecting surface 38. The inclined surface may be inclined towards the input beam 20, as shown in FIG. 2A, such that the reflected interferometer beam 36 is reflected through the portion of the input beam 20 forming the transmitted interferometer beam 34, or inclined away from the input beam 20, such that the reflected interferometer beam 36 is not reflected through the transmitted portion of the input beam 20.

In another embodiment, as shown in FIG. 2B, a reflection-type truncating splitter 30b may be employed to split the input beam 20 into two reflected beams. For example, the truncating splitter 30b may include two reflecting surfaces 38a and 38b, each for reflecting a respective portion of the input beam 20 incident thereon to produce the first interferometer beam 34 and the second interferometer beam 36.

Thus, the two reflecting surfaces 38a and 38b are positioned with respect to the input beam 20 to enable reflection of a respective portion of the input beam 20 from each surface 38a and 38b. In the embodiment shown in FIG. 2B, the first and second reflecting surfaces 38a and 38b are coupled at a shared edge thereof. This shared edge is aligned to receive a portion of the center of the input beam 20, thereby enabling the input beam 20 to be split into the two interferometer beams 34 and 36, which can then each be reflected by one of the reflecting surfaces 38a and 38b.

In each of FIGS. 2A and 2B, each of the reflecting surfaces 38 of the truncating splitters 30a and 30b are oriented at respective non-orthogonal angles with respect to the propagation direction of the input beam 20. In addition, the truncating splitters 30a and 30b are aligned with respect to the input beam 20 to enable spatial splitting of the input beam 20 without propagation of the input beam 20 through the truncating splitter 30a/30b. The splitting ratio between the two interferometer beams 34 and 36 (e.g., percentage of optical power of the input beam 20 provided to each interferometer beam 34 and 35) can be controlled by the position of the center of the input beam 20 with respect to the position of the reflecting surface(s) 38 of the truncating splitter 30a/30b.

FIG. 2C illustrates a configuration of a reflection/transmission-type truncating splitter 30a formed over a silicon on insulator (SOI) wafer or substrate 100, where the splitter is formed in the device layer over the substrate handle layer. An input fiber 110 directs the input beam 20 towards the truncating splitter 30a, where a portion of the input beam 20 is transmitted past the truncating splitter 30a to form the transmitted interferometer beam 34 and the other portion of the input beam 20 is reflected from the reflection surface 38 of the truncating splitter 30a to form the reflected interferometer beam 36. As can be seen in FIG. 2C, respective beam spots 32a and 32b of the transmitted and reflected beams 34 and 36 are each smaller than a spot size 22 of the input beam 20.

Figure 3A:
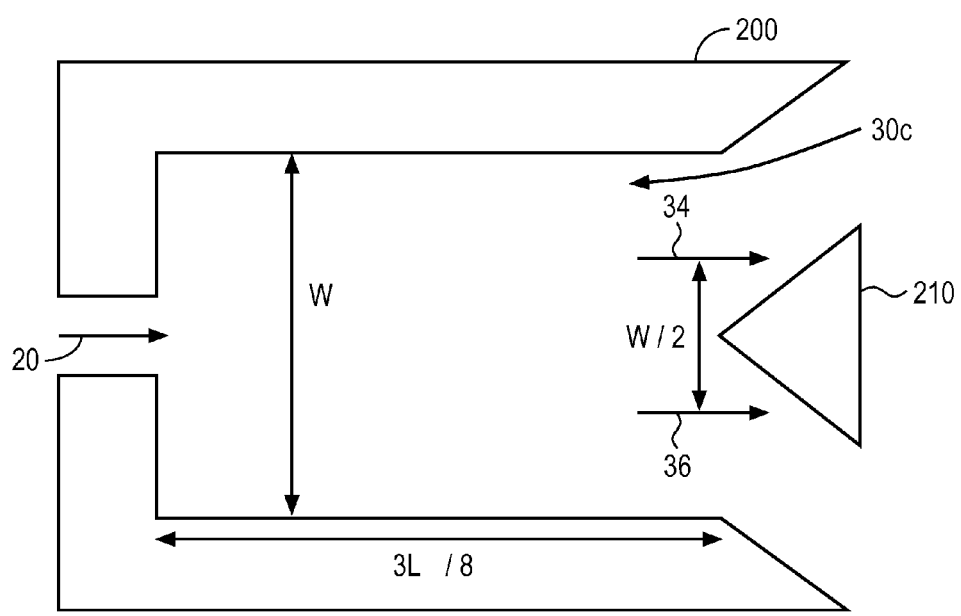
FIGS. 3A-3C illustrates another exemplary spatial splitter for use within the SSB-MI, in accordance with embodiments of the present invention.
Figure 3B:
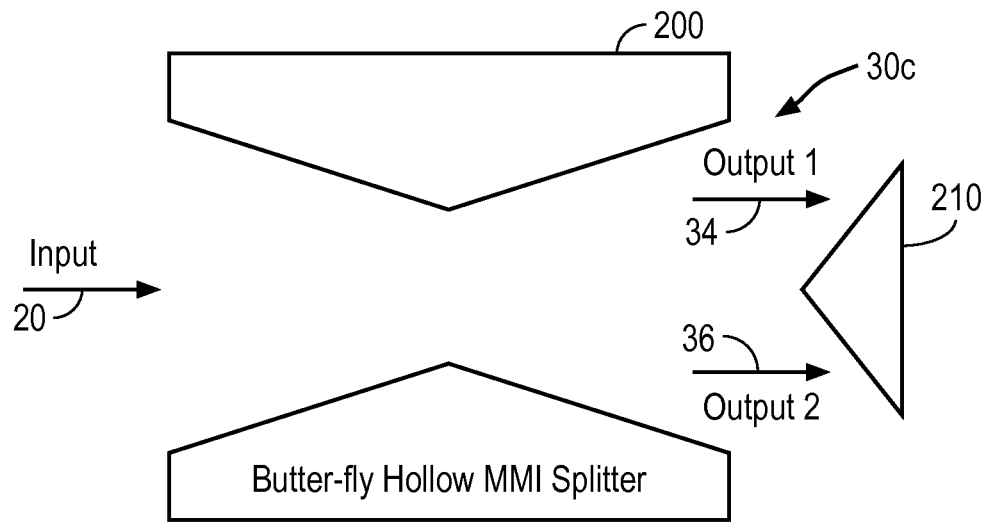
Figure 3C:
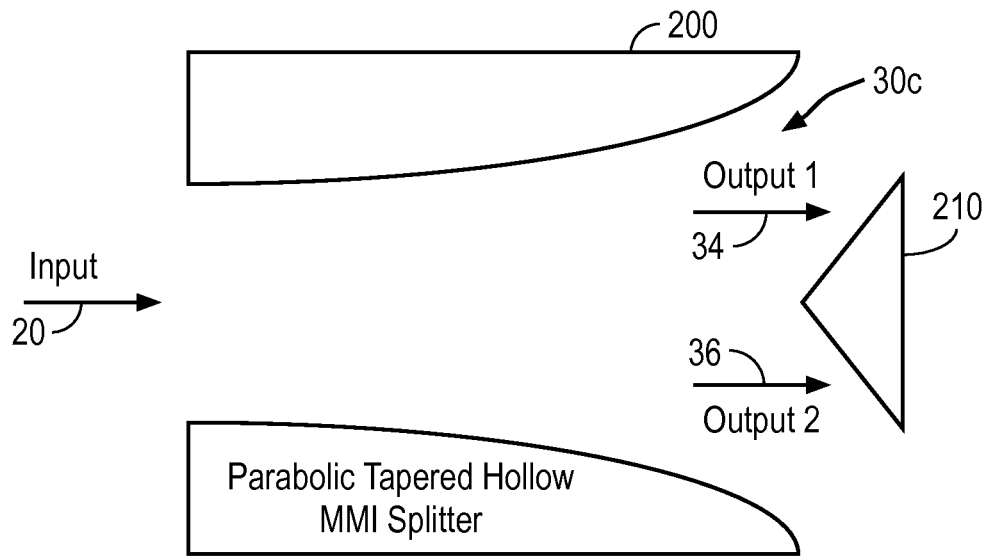

FIGS. 3A-3C illustrate another spatial splitter configuration in which the input beam 20 is imaged into two output beams (first and second interferometer beams 34 and 36) through a hollow Multi-Mode interference (MMI) waveguide 30c having a desired width and length. In an exemplary embodiment, the hollow MMI waveguide 30c is an air waveguide surrounded by silicon 200, so that the beam propagates through one medium (air) without propagation through silicon which causes guidance of the beam and consequently splitting thereof. For example, the air waveguide can be fabricated by selective etching of a silicon on insulator (SOI) wafer using any type of isotropic and/or anisotropic etching technique, such as Deep Reactive Ion Etching (DRIE).

In the embodiment shown in FIG. 3A, the input beam 20 is imaged into two replica beams 34 and 36 of the input beam with half beam power after a distance=$3L_\pi/8$, where $$L_\pi = \frac{4W^2}{3\lambda_o}, \quad \text{(Equation 1)}$$

with W being the waveguide width and $\lambda_o$ being the design wavelength. The two identical beams 34 and 36 may be optically coupled to a reflecting-type truncating splitter 210 just after the waveguide 30c to direct the beams 34 and 36 towards respective arms of the interferometer.

Unlike the truncating splitter shown in FIGS. 2A-2C, the hollow MMI waveguide splitter 30c shown in FIG. 3A is not a wide band device. However, the hollow MMI waveguide splitter 30c splits the input beam 20 softly, whereas the truncating splitter 30a/30b splits the input beam 20 sharply, which may lead to some diffraction losses. To increase the bandwidth of the hollow MMI waveguide splitter 30c, configurations other than one with constant width along its length may be used. For example, as shown in FIG. 3B, a butterfly MMI waveguide or, as shown in FIG. 3C, an MMI waveguide with parabolic width along its length may be used as the hollow MMI waveguide splitter 30c.

Figure 4A:
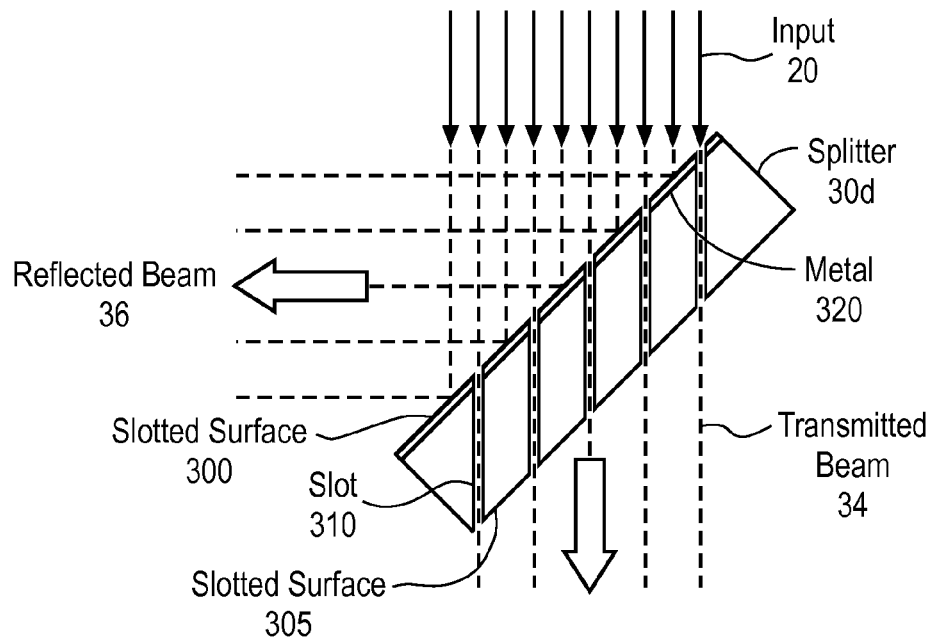
FIGS. 4A and 4B illustrate further exemplary spatial splitters for use within the SSB-MI, in accordance with embodiments of the present invention.
Figure 4B:
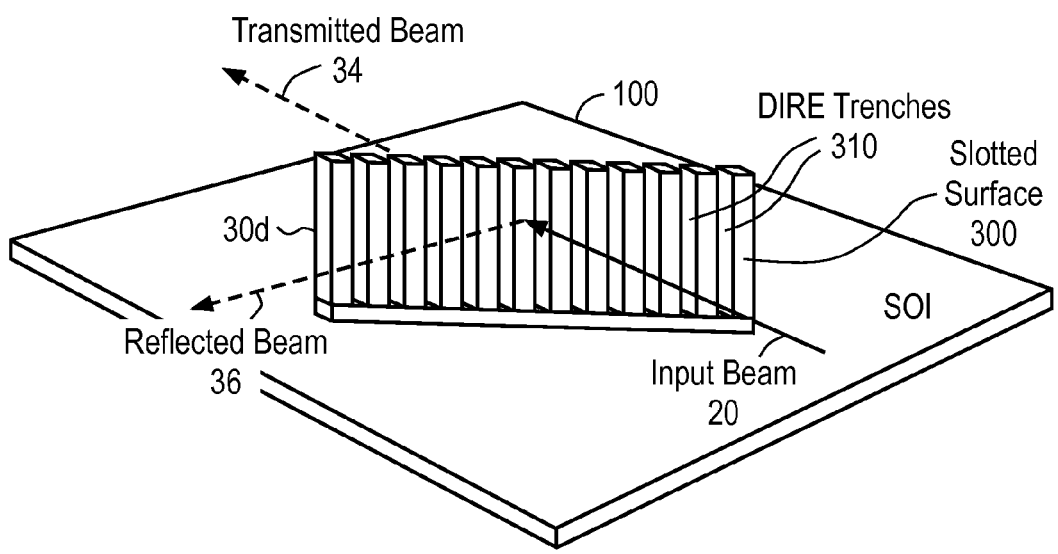

FIGS. 4A and 4B illustrate a slotted splitter 30d in which spatial splitting of the input beam 20 is based upon reflection/transmission through a slotted surface 300 formed of a plurality of slots 310 that extend through the splitter 30d. The slotted splitter 30d and slots 310 within the slotted splitter 30d are oriented with respect to the propagation direction of the input beam 20 to enable a portion of the input beam 20 to be passed through the slots 310 and the other portion of the input beam 20 to be reflected from the slotted surface. Such a slotted splitter 30d is a wide band device, but may suffer from diffraction loss due to sharp slot edges.

For example, as shown in FIG. 4A, the slots 310 can extend linearly through the splitter 30d (e.g., between a front slotted surface 300 and a back slotted surface 305 of the splitter 30d) and be oriented at non-orthogonal angles to the front and back slotted surfaces 300 and 305 such that the reflected interferometer beam 36 is reflected substantially through the input beam 20. In addition, the front slotted surface 300 can include a metal layer 320 thereon to enable reflection of a portion of the input beam 20 from the front slotted surface 300.

Spacing between the slots 310 may be uniform or non-uniform and the size of the slots (width of slots) may vary, depending on the interferometer application. However, a small slot size typically produces a higher splitting efficiency. In addition, the splitting ratio between the interferometer beams 34 and 36 may be controlled by the density of slots 300 within the center of the input beam 20.

FIG. 4B illustrates a configuration of a slotted splitter 30d formed over a silicon on insulator (SOI) wafer 100. The slotted splitter 30d can be fabricated, for example, using Deep Reactive Ion Etching (DRIE) technology to form DRIE trenches 310 in the SOI wafer 100, where the splitter is formed in the device layer over the substrate handle layer. The DRIE trenches 310 and slab of silicon therebetween collectively form a slotted surface 300 from which a portion of the input beam 20 is reflected to form the reflected interferometer beam 36. The other portion of the input beam 20 is transmitted through the DRIE trenches 310 to form the transmitted interferometer beam 34. The DRIE trenches 310 and slabs in between can be designed to have small width to produce a slotted splitter 30d with high splitting efficiency. To achieve a slotted splitter 30d with small trench and slab width near to wavelength, the DRIE process should be designed such that DRIE of such trenches 310 does not reach the oxide layer, while other trenches at the MEMS actuator and moveable mirror parts is etched to the end of the device layer to enable releasing such parts.

Figure 5:
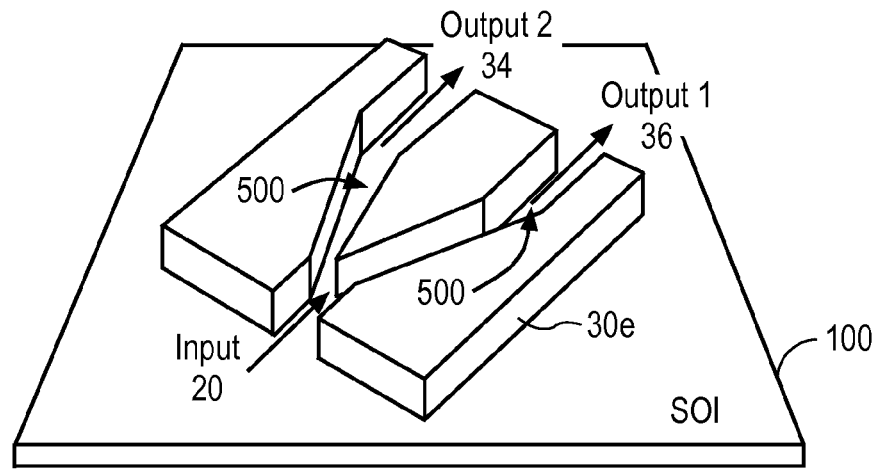
FIG. 5 illustrates another exemplary spatial splitter for use within the SSB-MI, in accordance with embodiments of the present invention.

FIG. 5 illustrates a Y-splitter 30e in which an input beam 20 is gradually split into the first and second interferometer beams 34 and 36 by directing a first portion of the input beam 20 through a first branch 500 of the Y-splitter 30e and a second portion of the input beam 20 through a second branch 505 of the Y-splitter 30e. As shown in FIG. 5, the Y-splitter 30e can be fabricated on an SOI substrate 100 using, for example, DRIE technology.

Figure 6:
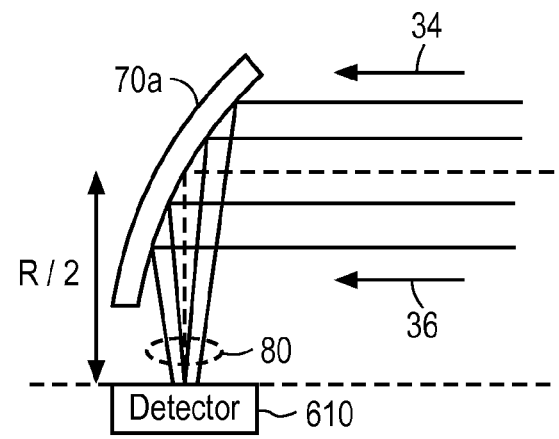
FIG. 6 illustrates an exemplary spatial combiner for use within the SSB-MI, in accordance with embodiments of the present invention.

Referring now to FIGS. 6-10, various exemplary spatial combiner configurations will now be presented. In FIG. 6, a parabolic-reflector combiner 70a is shown in which the two interferometer beams 34 and 36 are focused using a focusing element, such as a parabolic mirror or convex lens. A fiber or detector 610 is positioned at the focus (R/2) of the parabolic-reflector combiner 70a of radius of curvature R to receive the output 80 (i.e., interference pattern). Using a focusing element as a combiner 70a rather than using flat mirrors to direct the beams 34 and 36 to one point at the detector 610 may result in better visibility of interference between the two beams 34 and 36.

Figure 7:
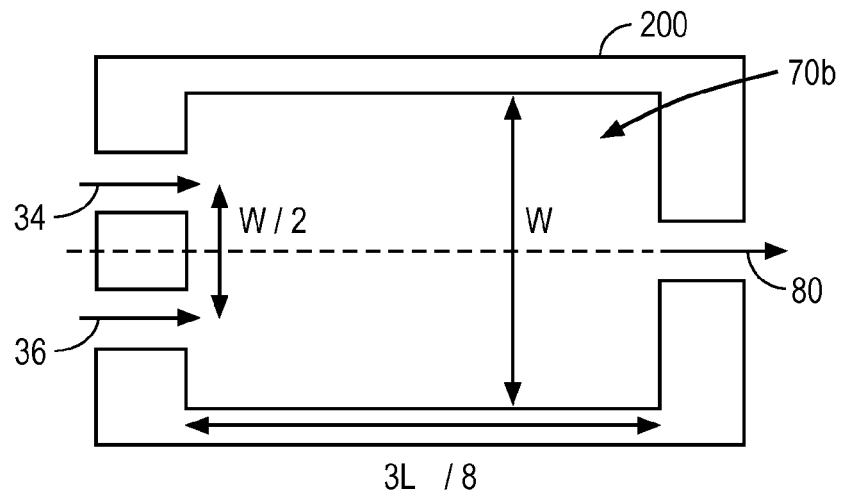
FIG. 7 illustrates another exemplary spatial combiner for use within the SSB-MI, in accordance with embodiments of the present invention.

FIG. 7 illustrates a hollow MMI waveguide combiner 70b, in which the two interferometer beams 34 and 36 are input to respective openings in the hollow MMI waveguide combiner 70b and combined to form a single beam 80 at an output thereof. The hollow MMI waveguide combiner 70b operates conceptually in the reverse of the hollow MMI waveguide splitter 30c described above. As such, after a distance=$3L_\pi/8$, where $L_\pi$ is defined in Equation 1 above, the two interferometer beams 34 and 36 will be combined to produce output 80 (i.e., interference pattern).

In an exemplary embodiment, the hollow MMI waveguide combiner 70b is an air waveguide surrounded by silicon 200. For example, the air waveguide can be fabricated by selective etching of a silicon on insulator (SOI) wafer using any type of isotropic and/or anisotropic etching technique, such as Deep Reactive Ion Etching (DRIE). Although the hollow MMI waveguide combiner 70b shown in FIG. 7 is a narrow band device, such a hollow MMI waveguide combiner 70b may have high efficiency in terms of insertion loss and visibility of interference between the two interferometer beams 34 and 36. In addition, to increase the bandwidth of the hollow MMI waveguide combiner 70b, configurations other than one with constant width along its length may be used. For example, a butterfly MMIW waveguide or a MMI waveguide with parabolic width along its length may be used as the hollow MMI waveguide combiner 70b.

Figure 8:
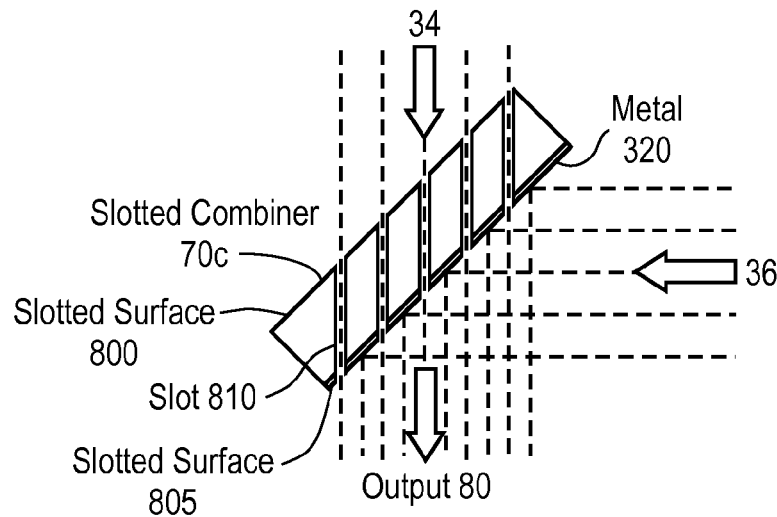
FIG. 8 illustrates another exemplary spatial combiner for use within the SSB-MI, in accordance with embodiments of the present invention.

FIG. 8 illustrates a slotted combiner 70c in which spatial combining of the interferometer beams 34 and 36 is based upon reflection/transmission through slotted surfaces 800 and 805 formed of a plurality of slots 310 that extend through the combiner 70c. The slotted combiner 70c and slots 810 within the slotted combiner 70c are oriented with respect to the propagation direction of the interferometer beams 34 and 36 to enable one of the interferometer beams 34 to be passed through the slots 810 and the other interferometer beam 36 to be reflected from a slotted surface 805 without passing through any of the slots 810.

For example, as shown in FIG. 8, a first interferometer beam 34 is received at a first slotted surface 800 of the slotted combiner 70c and directed through the slots 810, where the interferometer beam 34 exits through a second slotted surface 805 of the slotted combiner 70c. A second interferometer beam 36 is received at the second slotted surface 805 and reflected off the second slotted surface 805 to be combined with the first interferometer beam 34 to produce output 80 (i.e., interference pattern). In an exemplary embodiment, the second slotted surface is coated with a metal layer 320 to increase the reflection coefficient.

As in the slotted splitter shown in FIG. 4A, the slots 810 within the slotted combiner 70c can extend linearly through the combiner 70c (e.g., between the two slotted surfaces 800 and 805) and be oriented at non-orthogonal angles to the slotted surfaces 800 and 805 such that interferometer beam 36 after reflection is propagating in the same direction as interferometer beam 34. Spacing between the slots 810 may be uniform or non-uniform and the size of the slots (width of slots) may vary, depending on the interferometer application. However, a higher density of slots 810 may facilitate a higher throughput of the transmitted interferometer beam 34.

Figure 9:
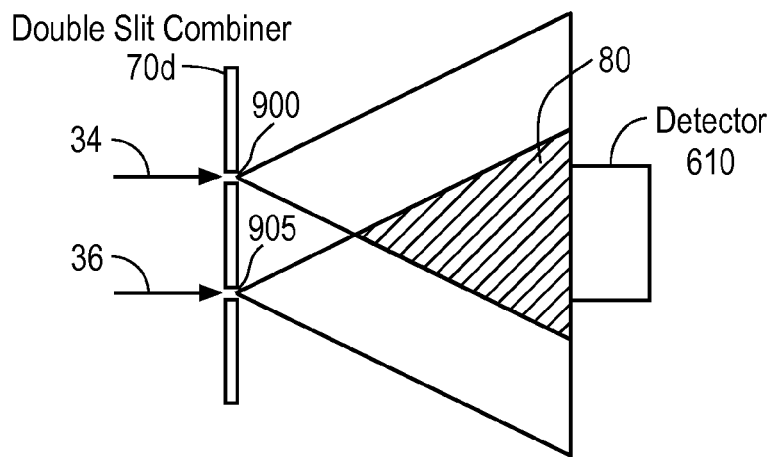
FIG. 9 illustrates another exemplary spatial combiner for use within the SSB-MI, in accordance with embodiments of the present invention.

FIG. 9 illustrates a double slit combiner 70d that enables interference of selected parts of the first and second interferometer beams 34 and 36 after diffraction through respective slits 900 and 905 to produce output 80 (interference pattern). The resulting interference pattern 80 can be output to an output fiber and/or detected by a detector 610, the latter being illustrated. In another embodiment, slits may not be used, such that the two interferometer beams 34 and 36 interfere after diffraction along a certain distance to the output fiber/detector 610.

Figure 10:
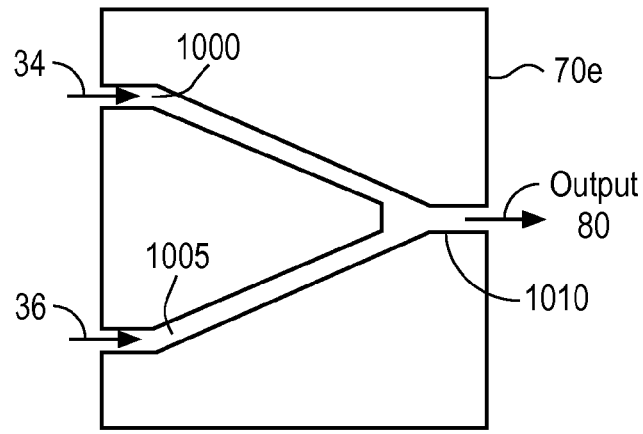
FIG. 10 illustrates another exemplary spatial combiner for use within the SSB-MI, in accordance with embodiments of the present invention.

FIG. 10 illustrates a Y-combiner 70e in which the interferometer beams 34 and 36 are gradually combined by directing a first interferometer beam 34 through a first branch 1000 of the Y-combiner 70e and a second interferometer beam 36 through a second branch 1005 of the Y-combiner 70e. The two interferometer beams 34 and 36 are combined at an output port 1010 of the Y-combiner 70e to produce the output 80 (i.e., interference pattern).

Various exemplary spatial splitting-based optical MEMS interferometer (SSB-MI) designs utilizing one or more of the above spatial splitter and spatial combiner configurations will now be described with reference to FIGS. 11-23. Turning first to FIGS. 11-16, various exemplary SSB-MI designs utilizing truncating spatial splitters are illustrated.

Figure 11:
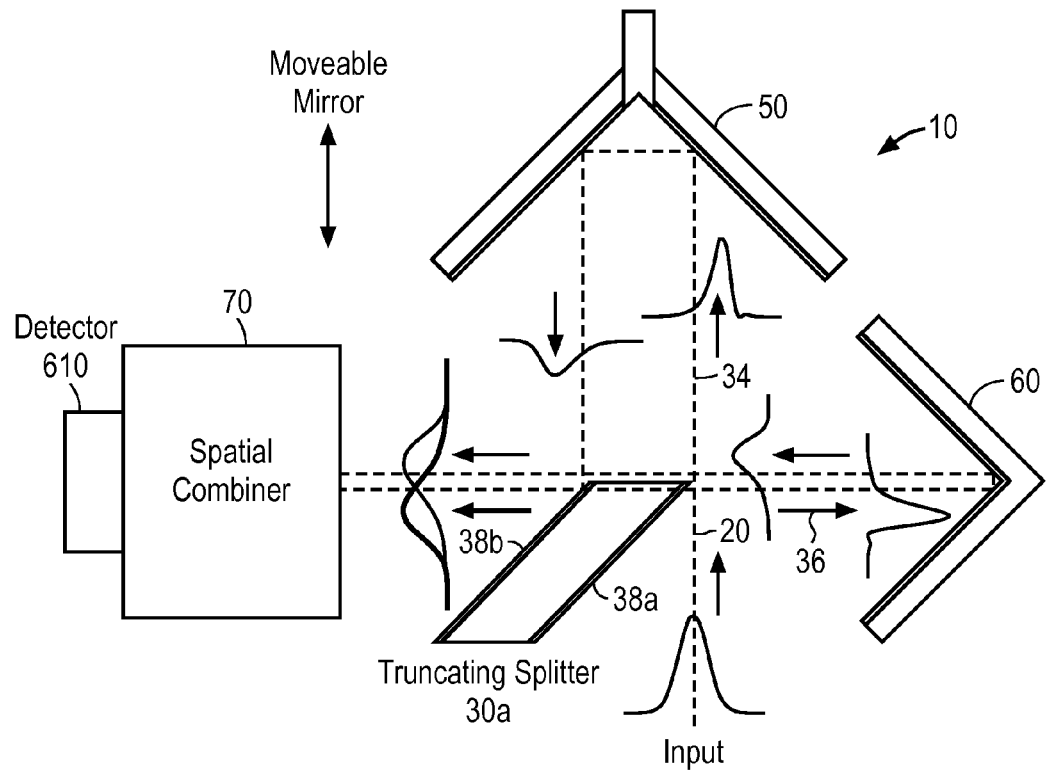
FIG. 11 illustrates an exemplary design of an SSB-MI, in accordance with embodiments of the present invention.

For example, in FIG. 11, a reflection/transmission-type truncating splitter 30a is included in a Mach-Zehnder type of SSB-MI 10 to spatially split the input beam 20 into the two interferometer beams 34 and 36. In particular, one portion of the input beam 20 is transmitted past the truncating splitter 30a without incidence on the truncating splitter 30a to produce a first interferometer beam 34, while the other portion of the input beam 20 is reflected from a reflecting surface 38a of the truncating splitter 30a to produce a second interferometer beam 36. The first interferometer beam 34 is directed towards a moveable mirror 50 in one interferometer arm and the second interferometer beam 36 is directed towards a fixed mirror 60 in the other interferometer arm. In the exemplary design shown in FIG. 11, the moveable mirror 50 and the fixed mirror 60 are each corner reflectors having two mirrored surfaces that collectively reflect the interferometer beams 34 and 36 back towards the truncating splitter 30a.

The second interferometer beam 36 reflected from the fixed corner reflector 60 is directed past the truncating splitter 30a towards the spatial combiner 70, which can have any type of configuration, such as one of the exemplary spatial combiner configurations described above in connection with FIGS. 6-10. The first interferometer beam reflected from the moveable corner reflector 50 is directed to a second reflecting surface 38b on the backside of the truncating splitter 30a (working as a pre-combiner) to be reflected towards the spatial combiner 70. The output of the spatial combiner 70 may then be provided, for example, to a detector 610. In the exemplary design shown in FIG. 11, the second reflecting surface 38b is opposite the first reflecting surface 38a on the truncating splitter 30a. However, in other embodiments, the second reflecting surface 38b may be adjacent to the first reflecting surface 38a. An optical path difference between the two interferometer beams 34 and 36 is introduced through motion of the moveable corner reflector 50 using, for example, a MEMS actuator (not shown).

Figure 12:
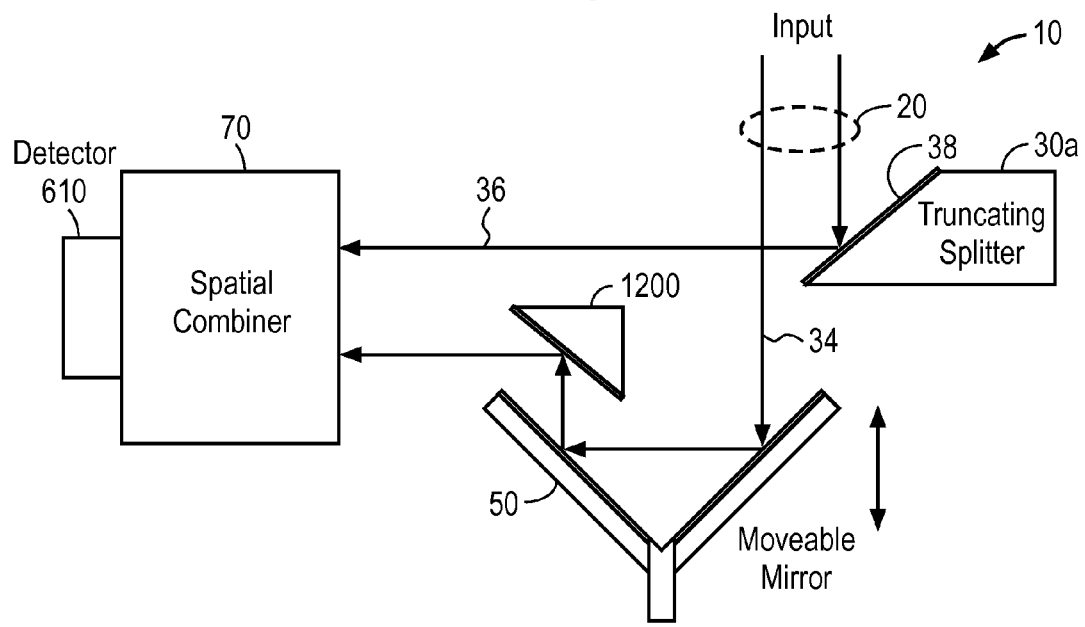
FIG. 12 illustrates another exemplary design of an SSB-MI, in accordance with embodiments of the present invention.

Turning now to FIG. 12, another exemplary SSB-MI design including a truncating splitter 30a is shown. In FIG. 12, a reflection/transmission-type truncating splitter 30a spatially splits the input beam 20 into the two interferometer beams 34 and 36, as described above. The first interferometer beam 34 is directed towards a moveable corner reflector 50 and the second interferometer beam 36 is reflected off the reflecting surface 38 of the truncating splitter 30a towards the spatial combiner, which can have any type of configuration, such as one of the exemplary spatial combiner configurations described above in connection with FIGS. 6-10. The first interferometer beam reflected from the moveable corner reflector 50 is directed towards a fixed flat mirror 1200 to be reflected towards the spatial combiner 70. The output of the spatial combiner 70 may then be provided, for example, to a detector 610. An optical path difference between the two interferometer beams 34 and 36 is introduced through motion of the moveable corner reflector 50 using, for example, a MEMS actuator (not shown).

Figure 13:
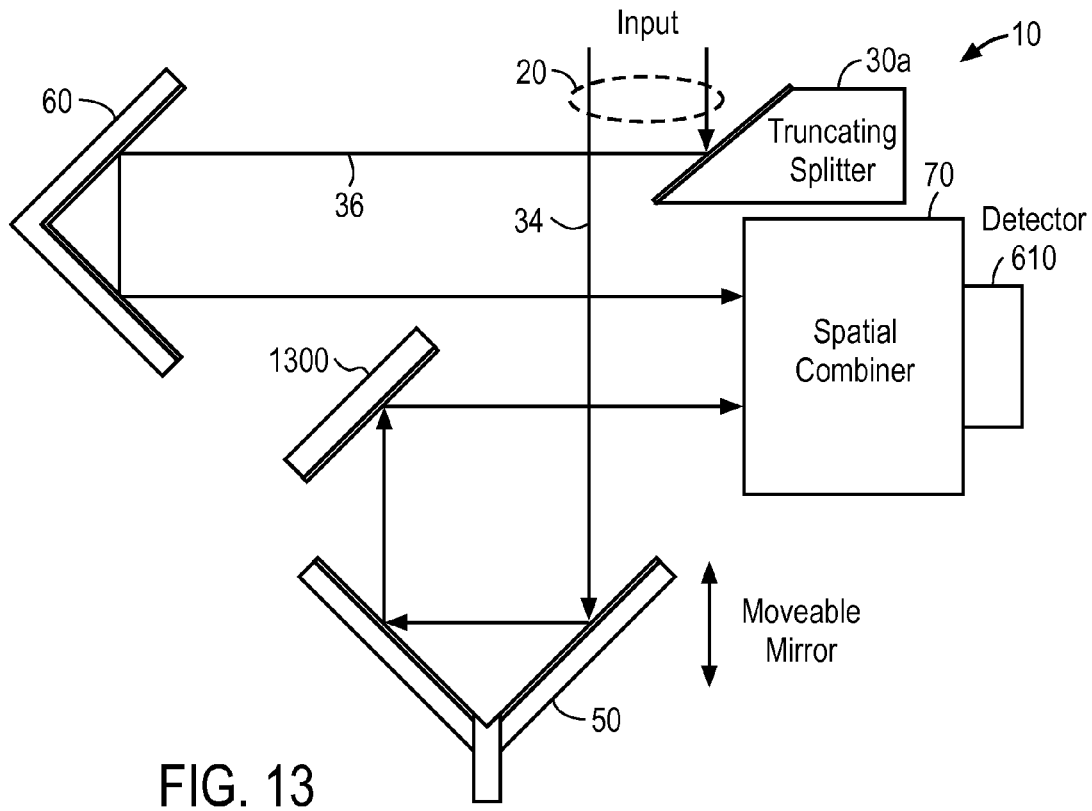
FIG. 13 illustrates another exemplary design of an SSB-MI, in accordance with embodiments of the present invention.

FIG. 13 illustrates another exemplary SSB-MI design including a truncating splitter 30*a*. In FIG. 13, a reflection/transmission-type truncating splitter 30*a* spatially splits the input beam 20 into the two interferometer beams 34 and 36, as described above. The first interferometer beam 34 is directed towards a moveable corner reflector 50 in the first interferometer arm and the second interferometer beam 36 is reflected off the reflecting surface 38 of the truncating splitter 30*a* towards a fixed corner reflector 60 in the second interferometer arm.

The second interferometer beam 36 reflected from the fixed corner reflector 60 is directed towards the spatial combiner 70, which can have any type of configuration, such as one of the exemplary spatial combiner configurations described above in connection with FIGS. 6-10. The first interferometer beam reflected from the moveable corner reflector 50 is directed towards a fixed flat mirror 1300 to be reflected towards the spatial combiner 70. The output of the spatial combiner 70 may then be provided, for example, to a detector 610. An optical path difference between the two interferometer beams 34 and 36 is introduced through motion of the moveable corner reflector 50 using, for example, a MEMS actuator (not shown).

Figure 14:
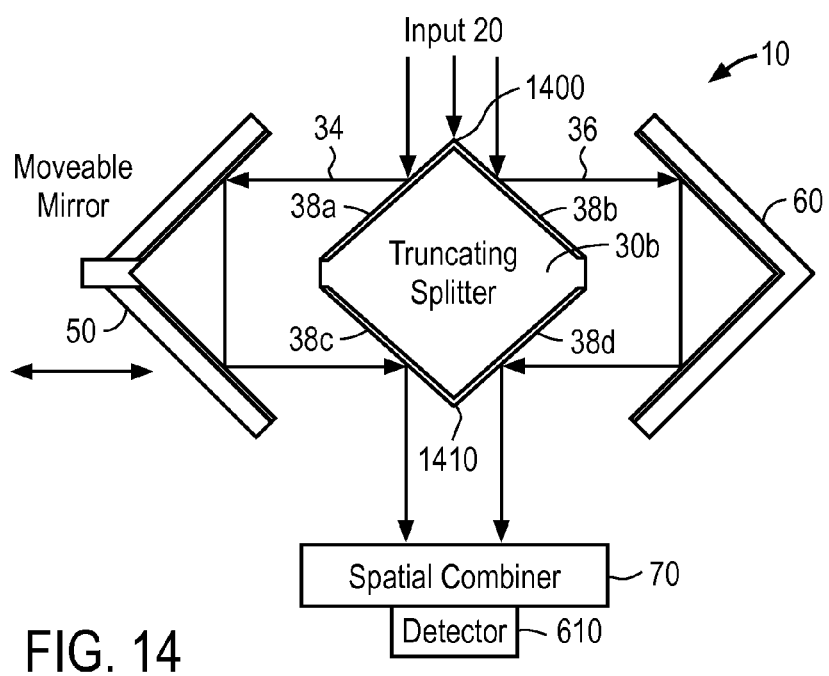
FIG. 14 illustrates another exemplary design of an SSB-MI, in accordance with embodiments of the present invention.

FIG. 14 illustrates another exemplary SSB-MI design including a truncating splitter 30*b*. In FIG. 14, a reflection-type truncating splitter 30*b* spatially splits the input beam 20 into the two interferometer beams 34 and 36. In particular, one portion of the input beam 20 is reflected from a first reflecting surface 38*a* to produce a first interferometer beam 34, while the other portion of the input beam 20 is reflected from a second reflecting surface 38*b* of the truncating splitter 30*a* to produce a second interferometer beam 36. The first interferometer beam 34 is directed towards a moveable corner reflector 50 in the first interferometer arm and the second interferometer beam 36 is directed towards a fixed corner reflector 60 in the second interferometer arm.

The first interferometer beam 34 is reflected from the moveable corner reflector 50 back towards the truncating splitter 30*b* to be reflected from a third reflecting surface 38*c* of the truncating splitter 30*b* towards the spatial combiner 70, which can have any type of configuration, such as one of the exemplary spatial combiner configurations described above in connection with FIGS. 6-10. Likewise, the second interferometer beam 36 is reflected from the fixed corner reflector 60 back towards the truncating splitter 30*b* to be reflected from a fourth reflecting surface 38*d* of the truncating splitter 30*b* towards the spatial combiner 70. The output of the spatial combiner 70 may then be provided, for example, to a detector 610. An optical path difference between the two interferometer beams 34 and 36 is introduced through motion of the moveable corner reflector 50 using, for example, a MEMS actuator (not shown).

As can be seen in FIG. 14, the two interferometer arms are substantially symmetric. This is achieved using a truncating splitter 30*b* with a rhombus shape such that a first edge 1400 shared between the first and second reflecting surfaces 38*a* and 38*b* is oriented with respect to the input beam 20 to receive at least a portion of the center of the input beam 20 and a second edge 1410 shared between the third and fourth reflecting surfaces 38*c* and 38*d* is opposite the first edge and oriented in the direction of the spatial combiner 70 to enable the first and second interferometer beams 34 and 36 to be reflected off reflecting surfaces 38*c* and 38*d* towards the spatial combiner 70.

Figure 15:
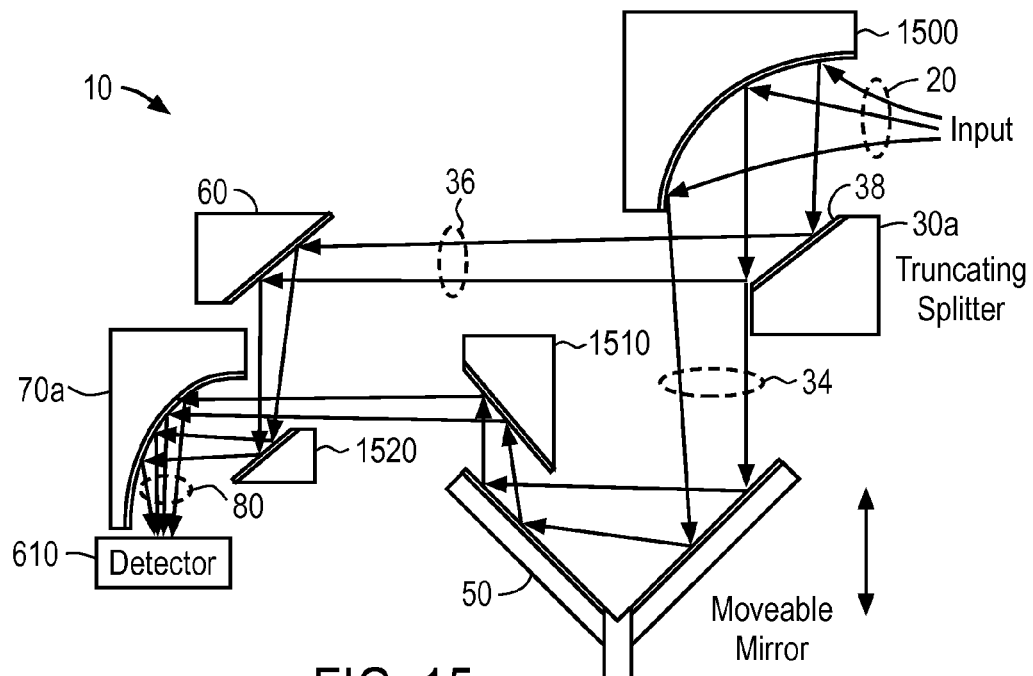
FIG. 15 illustrates another exemplary design of an SSB-MI, in accordance with embodiments of the present invention.

FIG. 15 illustrates another exemplary SSB-MI design including a truncating splitter 30*a*. In FIG. 15, a reflection/transmission-type truncating splitter 30*a* spatially splits the input beam 20 into the two interferometer beams 34 and 36, as described above. The first interferometer beam 34 is directed towards a moveable corner reflector 50 in the first interferometer arm and the second interferometer beam 36 is reflected off the reflecting surface 38 of the truncating splitter 30*a* towards a fixed flat mirror 60 in the second interferometer arm.

The first interferometer beam 34 reflected from the moveable corner reflector 50 is directed towards a fixed flat mirror 1510 to be reflected towards the spatial combiner 70*a*. The second interferometer beam 36 reflected from the fixed flat mirror 60 is directed towards another fixed flat mirror 1520 to be reflected towards the spatial combiner 70*a*. In FIG. 15, the spatial combiner is a parabolic-reflector combiner 70*a* that reflects the two interferometer beams 34 and 36 such that the beams 34 and 36 interfere at a detector 610 positioned at the focal point of the parabolic-reflector combiner 70*a*. An optical path difference between the two interferometer beams 34 and 36 is introduced through motion of the moveable corner reflector 50 using, for example, a MEMS actuator (not shown).

To achieve good interferogram visibility, the separation between the output beams 80 should be as small as possible upon incidence to the parabolic-reflector combiner 70*a*. This can be achieved using a focusing curved reflector 1500 at the input of the interferometer such that its focus is near the combiner 70*a*. The design shown in FIG. 15 is more efficient for coherent beams, such as laser beams, as it can be focused and collimated easily in micro-scale, which may not be possible for non-coherent beams, such as white light.

Figure 16:
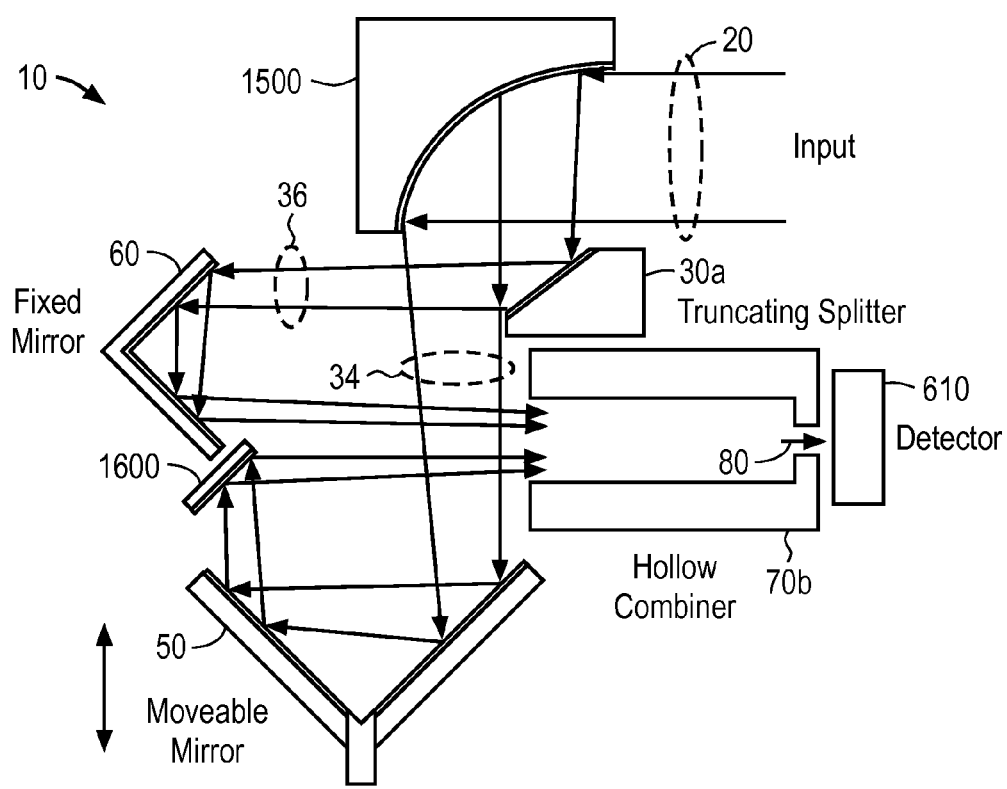
FIG. 16 illustrates another exemplary design of an SSB-MI, in accordance with embodiments of the present invention.

FIG. 16 illustrates another exemplary SSB-MI design including a truncating splitter 30*a*. As in FIG. 15, a focusing curved reflector 1500 at the input of the interferometer to direct the input beam 20 towards a reflection/transmission-type truncating splitter 30*a*. The truncating splitter 30*a* spatially splits the input beam 20 into the two interferometer beams 34 and 36, as described above. The first interferometer beam 34 is directed towards a moveable corner reflector 50 in the first interferometer arm and the second interferometer beam 36 is reflected off the reflecting surface 38 of the truncating splitter 30*a* towards a fixed corner reflector 60 in the second interferometer arm.

The first interferometer beam 34 reflected from the moveable corner reflector 50 is directed towards a fixed flat mirror 1600 to be reflected towards the spatial combiner 70*b*. The second interferometer beam 36 reflected from the fixed corner reflector 60 is directed towards the spatial combiner 70*b*. In FIG. 16, the spatial combiner is a hollow MMI waveguide combiner 70*b* that combines the two interferometer beams 34 and 36 to produce an output 80 that is directed towards a detector 610. An optical path difference between the two interferometer beams 34 and 36 is introduced through motion of the moveable corner reflector 50 using, for example, a MEMS actuator (not shown).

Figure 17A:
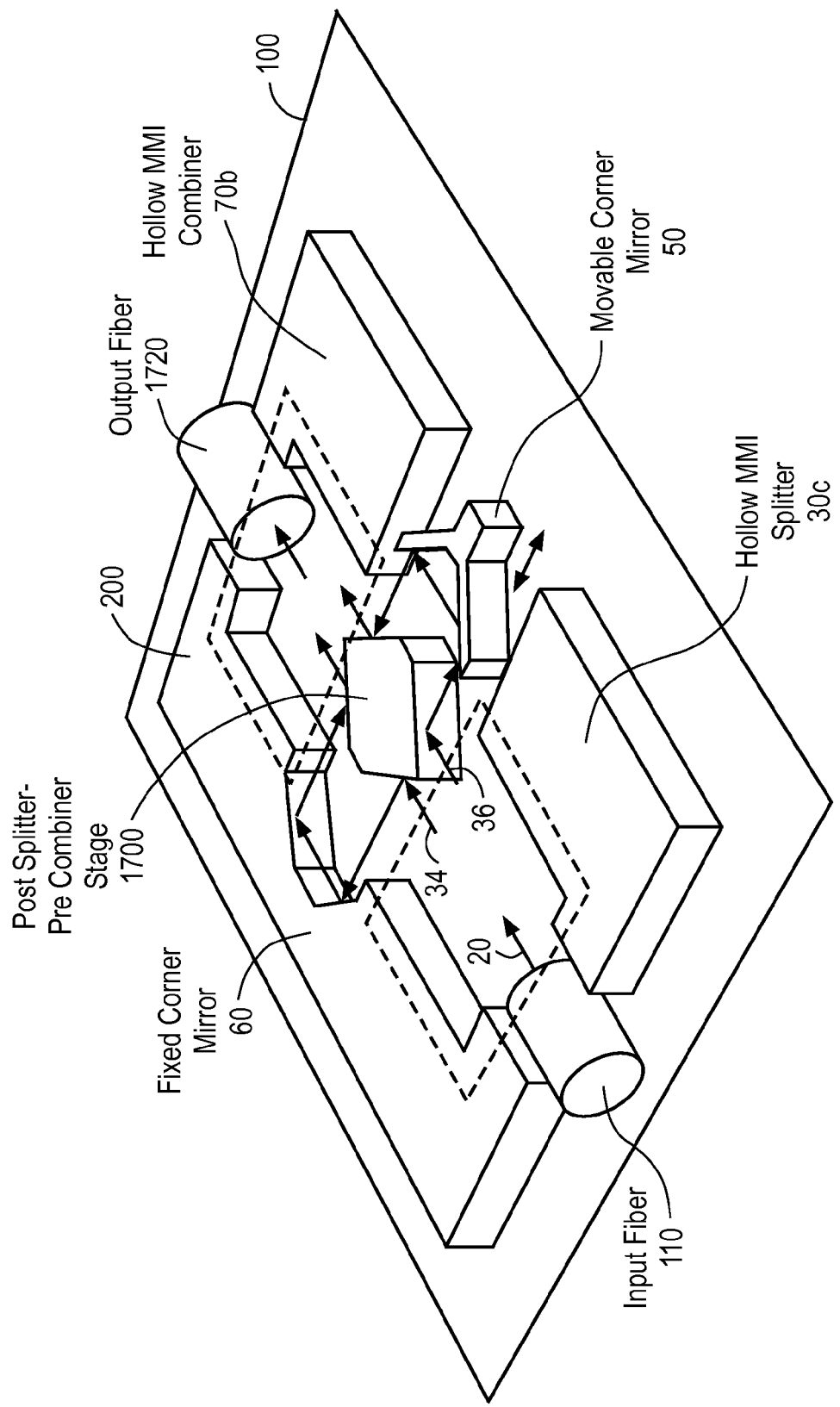
FIGS. 17A and 17B illustrate other exemplary designs of an SSB-MI, in accordance with embodiments of the present invention.
Figure 17B:
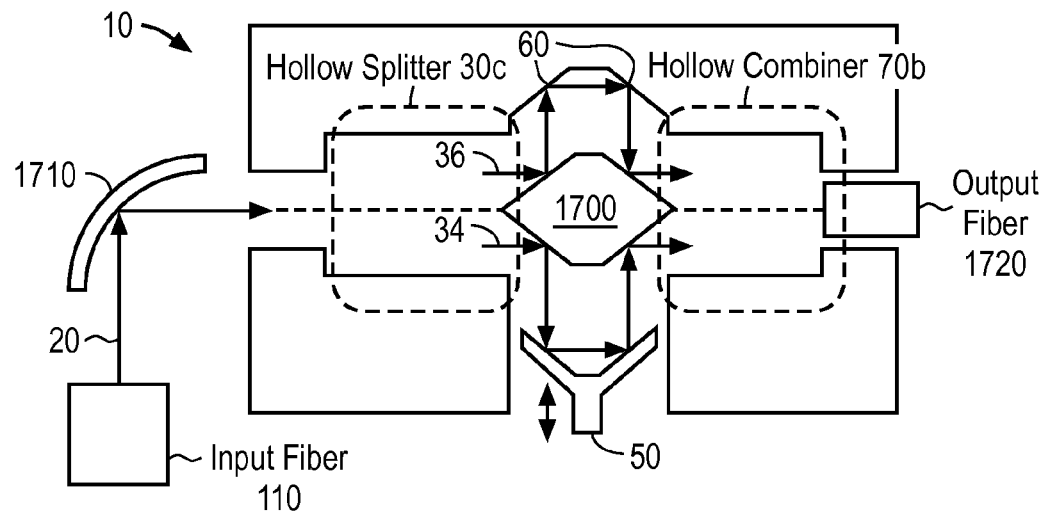
Figure 18:
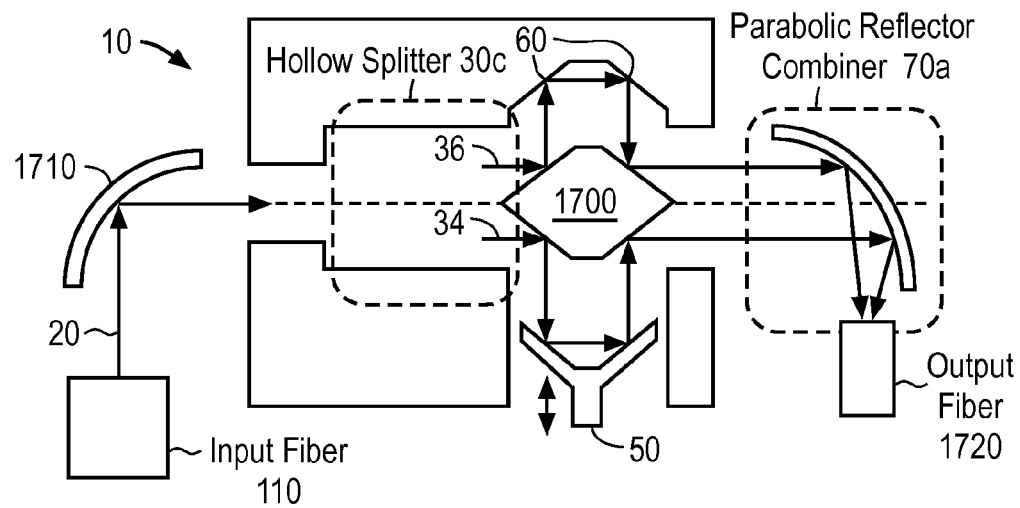
FIG. 18 illustrates another exemplary design of an SSB-MI, in accordance with embodiments of the present invention.

FIGS. 17A, 17B and 18 illustrate various exemplary SSB-MI designs utilizing hollow MMI waveguide spatial splitters. For example, in FIG. 17A, an input fiber 110 provides an input beam 20 to a hollow MMI waveguide spatial splitter 30*c* that spatially splits the input beam 20 into the two interferometer beams 34 and 36. In particular, the hollow MMI waveguide 30c images the input beam 20 into two replica beams (interferometer beams) 34 and 36 of the input beam with half beam power. The two identical beams 34 and 36 are optically coupled to a reflecting-type truncating splitter 1700 just after the waveguide 30c to direct the beams 34 and 36 towards respective arms of the interferometer. As in FIG. 14, the reflecting-type truncating splitter 1700 in FIG. 17A has a rhombus shape with four reflecting surfaces, resulting in substantially symmetric interferometer arms.

The first interferometer beam 34 is directed from the splitter 1700 towards a moveable corner reflector 50 in the first interferometer arm and the second interferometer beam 36 is directed from the splitter 1700 towards a fixed corner reflector 60 in the second interferometer arm. The first interferometer beam 34 is reflected from the moveable corner reflector 50 back towards the splitter 1700 to be reflected towards the spatial combiner, which in FIG. 17A is a hollow MMI waveguide combiner 70b. Likewise, the second interferometer beam 36 is reflected from the fixed corner reflector 60 back towards the splitter 1700 to be reflected towards the spatial combiner 70b. The hollow MMI waveguide combiner combines the two interferometer beams to produce an output (i.e., interference pattern) to an output fiber 1720. An optical path difference between the two interferometer beams 34 and 36 is introduced through motion of the moveable corner reflector 50 using, for example, a MEMS actuator (not shown).

As can be seen in FIG. 17A, the hollow MMI waveguide splitter 30c, fixed corner reflector 60, hollow MMI waveguide combiner 70b and moveable corner reflector 50 are fabricated in a silicon device layer of an SOI wafer 100, such that the hollow MMI waveguide splitter 30c and hollow MMI waveguide combiner 70b are air waveguides surrounded by silicon 200 and the fixed corner reflector is formed by etching the silicon wall between the two waveguides 30c and 70b. The moveable corner reflector 50 is fabricated by etching through the silicon wall between the two waveguides 30c and 70b (e.g., typically by etching the buried $SiO_2$ beneath the device layer of an SOI wafer) to release the moveable corner reflector 50.

The respective length of each of the hollow MMI waveguide splitter 30c and the hollow MMI waveguide combiner 70b is related to the width of the waveguides 30c and 70b. Each waveguide 30c and 70b should be wider than input beam 20 spot size, so the length of the waveguides is larger for wider input beam spot sizes. As such, it is recommended to focus the input spot as small as possible. Therefore, in an exemplary embodiment, as shown in FIG. 17B, a parabolic focusing element 1710 may be included at the input of hollow MMI waveguide splitter 30c. Thus, in FIG. 17B, an input fiber 110 directs an input beam 20 towards the parabolic focusing element 1710, which focuses the input beam 20 at the input of a hollow MMI waveguide spatial splitter 30c. The hollow MMI waveguide splitter 30c spatially splits the input beam 20 into the two interferometer beams 34 and 36, as described above. The two identical beams 34 and 36 are optically coupled to a reflecting-type truncating splitter 1700 just after the waveguide 30c to direct the beams 34 and 36 towards respective arms of the interferometer.

The first interferometer beam 34 is directed from the splitter 1700 towards a moveable corner reflector 50 in the first interferometer arm and the second interferometer beam 36 is directed from the splitter 1700 towards a fixed corner reflector 60 in the second interferometer arm. The first interferometer beam 34 is reflected from the moveable corner reflector 50 back towards the splitter 1700 to be reflected towards the spatial combiner, which in FIG. 17A is a hollow MMI waveguide combiner 70b. Likewise, the second interferometer beam 36 is reflected from the fixed corner reflector 60 back towards the splitter 1700 to be reflected towards the spatial combiner 70b. The hollow MMI waveguide combiner 70b combines the two interferometer beams to produce an output (i.e., interference pattern) to output fiber 1720. An optical path difference between the two interferometer beams 34 and 36 is introduced through motion of the moveable corner reflector 50 using, for example, a MEMS actuator (not shown).

In FIG. 18, a parabolic-reflector combiner 70a is used instead of a hollow MMI waveguide combiner to increase the interferometer bandwidth. Thus, in FIG. 18, an input fiber 110 directs an input beam 20 towards a parabolic focusing element 1710, which focuses the input beam 20 at the input of a hollow MMI waveguide spatial splitter 30c. The hollow MMI waveguide splitter 30c spatially splits the input beam 20 into the two interferometer beams 34 and 36, as described above. The two identical beams 34 and 36 are optically coupled to a reflecting-type truncating splitter 1700 just after the waveguide 30c to direct the beams 34 and 36 towards respective arms of the interferometer.

The first interferometer beam 34 is directed from the splitter 1700 towards a moveable corner reflector 50 in the first interferometer arm and the second interferometer beam 36 is directed from the splitter 1700 towards a fixed corner reflector 60 in the second interferometer arm. The first interferometer beam 34 is reflected from the moveable corner reflector 50 back towards the splitter 1700 to be reflected towards the spatial combiner, which in FIG. 18 is a parabolic-reflector combiner 70a. Likewise, the second interferometer beam 36 is reflected from the fixed corner reflector 60 back towards the splitter 1700 to be reflected towards the spatial combiner 70a. The parabolic-reflector combiner 70a focuses the two beams 34 and 36 at an output fiber 1720. An optical path difference between the two interferometer beams 34 and 36 is introduced through motion of the moveable corner reflector 50 using, for example, a MEMS actuator (not shown). It should be understood that in other embodiments, other spatial combiner configurations can be used with a hollow MMI waveguide splitter 30c.

Figure 19:
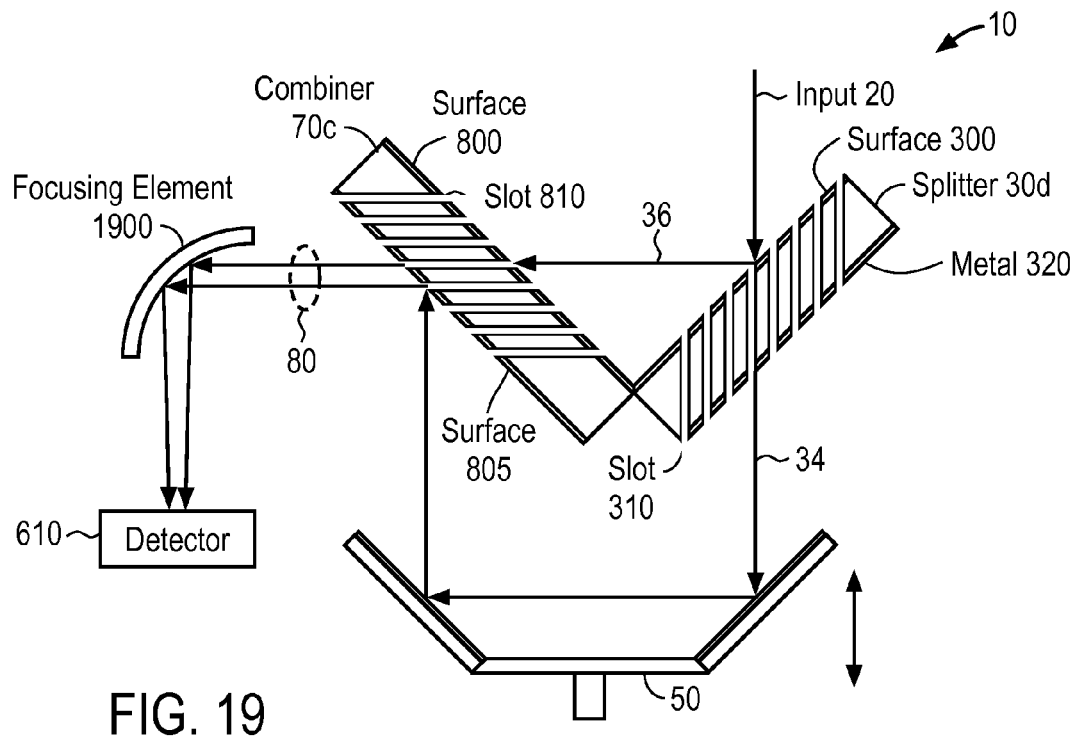
FIG. 19 illustrates another exemplary design of an SSB-MI, in accordance with embodiments of the present invention.
Figure 20:
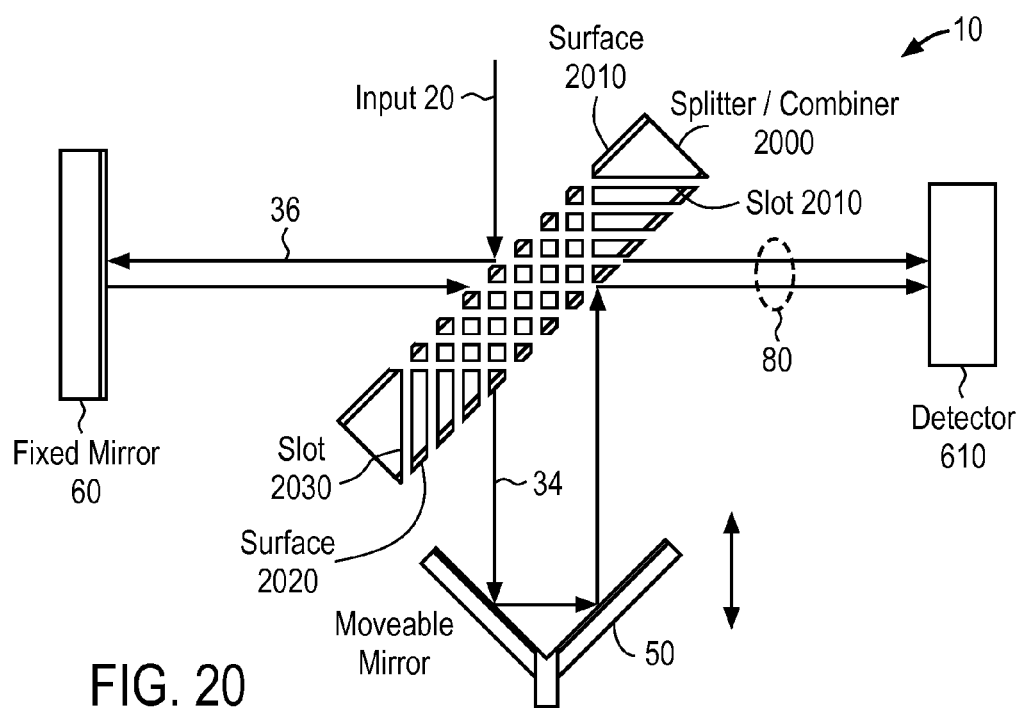
FIG. 20 illustrates exemplary design of an SSB-MI, in accordance with embodiments of the present invention.

FIGS. 19 and 20 illustrate various exemplary SSB-MI designs utilizing slotted splitters. For example, in FIG. 19, a slotted splitter 30d spatially splits the input beam 20 into the two interferometer beams 34 and 36. In particular, the slotted splitter 30d and slots 310 within the slotted splitter 30d are oriented with respect to the propagation direction of the input beam 20 to enable a portion of the input beam 20 to be passed through the slots 310 in a slotted surface 300 of the slotted splitter 30d as the first interferometer beam 34 and the other portion of the input beam 20 to be reflected from the slotted surface 300 of the slotted splitter 30d as the second interferometer beam 36.

The first interferometer beam 34 is directed towards a moveable corner reflector 50 and the second interferometer beam 36 is directed towards the spatial combiner, which in FIG. 19 is a slotted combiner 70c. However, it should be understood that any spatial combiner configuration, such as those described above in connection with FIGS. 6-10, may be used with a slotted splitter 30d.

The second interferometer beam 36 is received at a first slotted surface 800 of the slotted combiner 70c and directed through slots 810, where the interferometer beam 34 exits through a second slotted surface 805 of the slotted combiner 70c. The first interferometer beam 34 reflected from the moveable corner reflector 50 is received at the second slotted surface 805 and reflected off the second slotted surface 805 to be combined with the second interferometer beam 36 to produce output 80. The output 80 of the slotted combiner 70c is directed to focusing element 1900, which focuses the output 80 on a detector 610. An optical path difference between the two interferometer beams 34 and 36 is introduced through motion of the moveable corner reflector 50 using, for example, a MEMS actuator (not shown).

In FIG. 20, a single slotted splitter/combiner 2000 combines both the slotted splitter and slotted combiner into one structure. Utilizing this type of splitter/combiner configuration in an SSB-MI 10 creates a Michelson-type of interferometer. As can be seen in FIG. 20, the slotted splitter/combiner 2000 includes a first slotted surface 2010, a second slotted surface 2020, a first set of slots 2030 that extends through the slotted splitter/combiner 2000 between the surfaces 2010 and 2020, and a second set of slots 2040 that also extends through the slotted splitter/combiner between the surfaces 2010 and 2020.

The slotted splitter/combiner 2000 is optically coupled to receive an input beam 20 at the first slotted surface 2010 and is configured to spatially split the input beam 20 into the two interferometer beams 34 and 36. In particular, the first set of slots 2030 are oriented with respect to a direction of propagation of the input beam 20 to enable a portion of the input beam 20 to be passed through the first set of slots 2030 and exit the second slotted surface 2020 and the other portion of the input beam 20 to be reflected from the first slotted surface 2010.

The first interferometer beam 34 is directed towards a moveable corner reflector 50 and the second interferometer beam 36 is directed towards a fixed flat mirror 60. In the embodiment shown in FIG. 20, the fixed flat mirror 60 is substantially orthogonal to the direction of propagation of the second interferometer beam 36 such that the fixed flat mirror 60 reflects the second interferometer beam 36 directly back to the first slotted surface 2010 of the slotted splitter/combiner 2000. In other embodiments, the fixed flat mirror 60 could be replaced by a corner reflector or other combination of reflecting surfaces.

The second set of slots 2040 are oriented with respect to a direction of propagation of the second interferometer beam 36 reflected from the fixed flat mirror 60 to enable the second interferometer beam 36 to pass through the second set of slots 2040 and exit through the second slotted surface 2020 of the slotted splitter/combiner 2000. The first interferometer beam 34 reflected from the moveable corner reflector 50 is received at the second slotted surface 2020 and reflected off the second slotted surface 2020 to be combined with the second interferometer beam 36 to produce output 80 (i.e., interference pattern). The output 80 of the slotted splitter/combiner 200 is directed to detector 610. An optical path difference between the two interferometer beams 34 and 36 is introduced through motion of the moveable corner reflector 50 using, for example, a MEMS actuator (not shown).

Figure 21A:
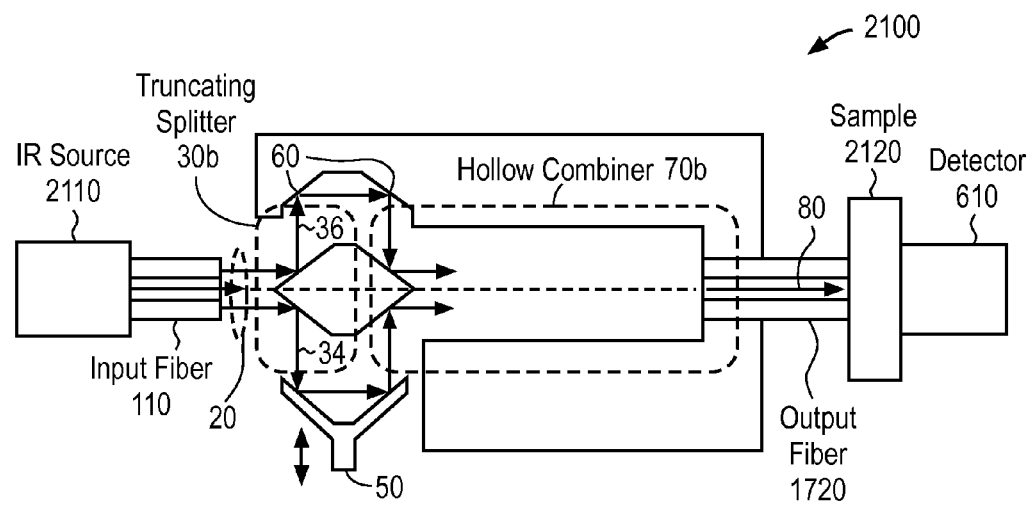
FIGS. 21A and 21B illustrate exemplary applications of the SSB-MI, in accordance with embodiments of the present invention.
Figure 21B:
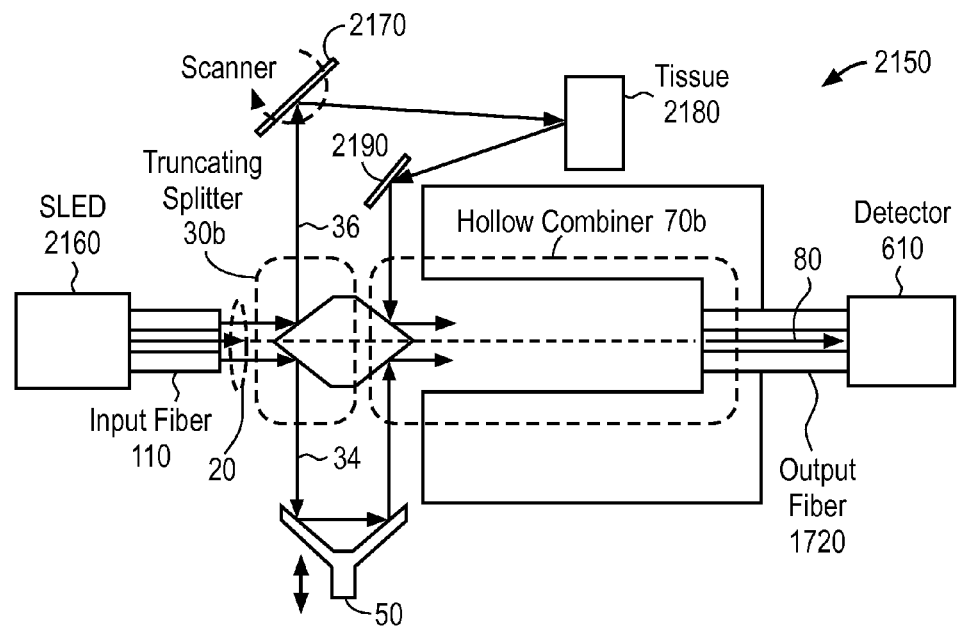

Turning now to FIGS. 21A and 21B, SSB-MI's may be used in many applications related to biology, astronomy, engineering, etc. For example, FIG. 21A illustrates employing an SSB-MI to build an FTIR (Fourier Transform Infrared) Spectrometer 2100, where an IR Source 2110 is used as an optical input and a Sample 2120 is inserted before the detector 610. Measuring the interferogram at the detector 610, absorption spectrum of the Sample can be extracted by calculating the Fourier transform of the interferogram signal.

In the FTIR Spectrometer shown in FIG. 21A, the IR Source 2110 generates an input beam 20 that is directed by input fiber 110 to a reflection-type truncating splitter 30b. The truncating splitter 30b spatially splits the input beam 20 into the two interferometer beams 34 and 36 by reflecting one portion of the input beam 20 from a first reflecting surface to produce a first interferometer beam 34 and the other portion of the input beam 20 from a second reflecting surface to produce a second interferometer beam 36. The first interferometer beam 34 is directed towards a moveable corner reflector 50 in the first interferometer arm and the second interferometer beam 36 is directed towards a fixed corner reflector 60 in the second interferometer arm.

The first interferometer beam 34 is reflected from the moveable corner reflector 50 back towards the truncating splitter 30b to be reflected from a third reflecting surface of the truncating splitter 30b towards a hollow MMI waveguide combiner 70b. Likewise, the second interferometer beam 36 is reflected from the fixed corner reflector 60 back towards the truncating splitter 30b to be reflected from a fourth reflecting surface of the truncating splitter 30b towards the hollow MMI waveguide combiner 70b. The hollow MMI waveguide combiner 70b combines the first and second interferometer beams 34 and 36 to produce an output 80 (i.e., interference pattern) that is provided to an output fiber 1720. The output fiber 1720 directs the output through the Sample 2120 and towards the detector 610, where an interferogram is measured.

SSB-MI's can be used also in time-domain OCT (Optical Coherence Tomography) systems 2150, as shown in FIG. 21B, where the fixed mirror in the fixed mirror interferometer arm is replaced by a scanner 2170, a Sample (Tissue 2180) is inserted into the fixed mirror interferometer arm and a SLED (Superluminescent Light Emitting Diode) 2160 is used as an optical input source. By measuring the interferogram at the detector 610, tissue layer positions can be determined from interferogram peaks (bursts).

In the OCT system 2150 shown in FIG. 21B, the SLED 2160 generates an input beam 20 that is directed by input fiber 110 to a reflection-type truncating splitter 30b. The truncating splitter 30b spatially splits the input beam 20 into the two interferometer beams 34 and 36 by reflecting one portion of the input beam 20 from a first reflecting surface to produce a first interferometer beam 34 and the other portion of the input beam 20 from a second reflecting surface to produce a second interferometer beam 36. The first interferometer beam 34 is directed towards a moveable corner reflector 50 in the first interferometer arm and the second interferometer beam 36 is directed towards the Scanner 2170 in the second interferometer arm.

The first interferometer beam 34 is reflected from the moveable corner reflector 50 back towards the truncating splitter 30b to be reflected from a third reflecting surface of the truncating splitter 30b towards a hollow MMI waveguide combiner 70b. The second interferometer beam 36 is reflected from the Scanner 2170 towards the Tissue 2180. The Scanner 2170 directs the second interferometer beam 36 to different parts of the Tissue 2180 over time. The second interferometer beam 36 penetrates the Tissue 2180 and is scattered from various surfaces within the Tissue 2180 towards fixed mirror 2190. Fixed mirror 2190 reflects the second interferometer beam 36 back towards the truncating splitter 30b to be reflected from a fourth reflecting surface of the truncating splitter 30b towards the hollow MMI waveguide combiner 70b. The hollow MMI waveguide combiner 70b combines the first and second interferometer beams 34 and 36 to produce an output 80 (i.e., interference pattern) that is provided to an output fiber 1720. The output fiber 1720 directs the output towards the detector 610, where an interferogram is measured.

Figure 22A:
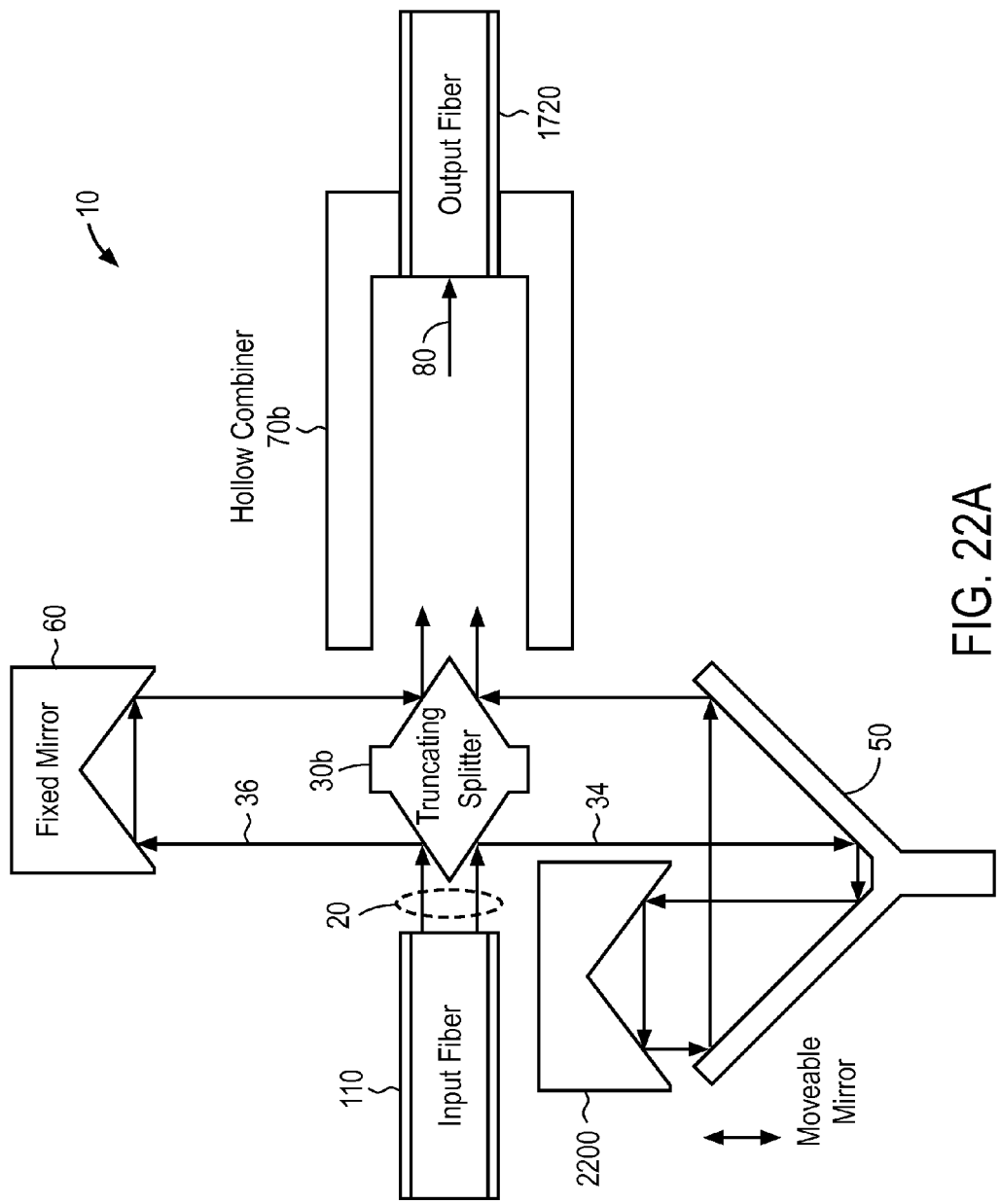
FIGS. 22A-22C illustrate other exemplary applications of the SSB-MI, in accordance with embodiments of the present invention.
Figure 22B:
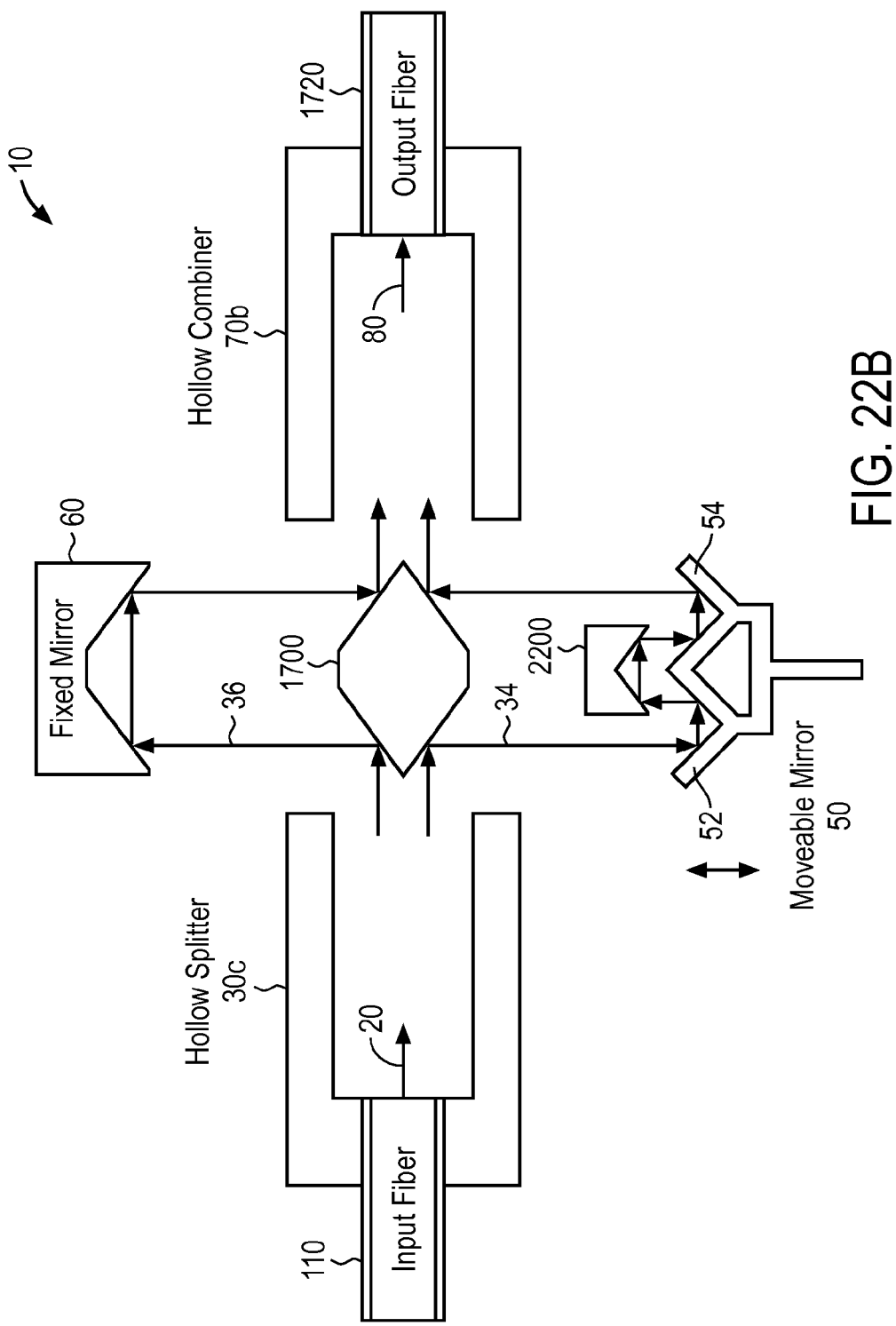
Figure 22C:
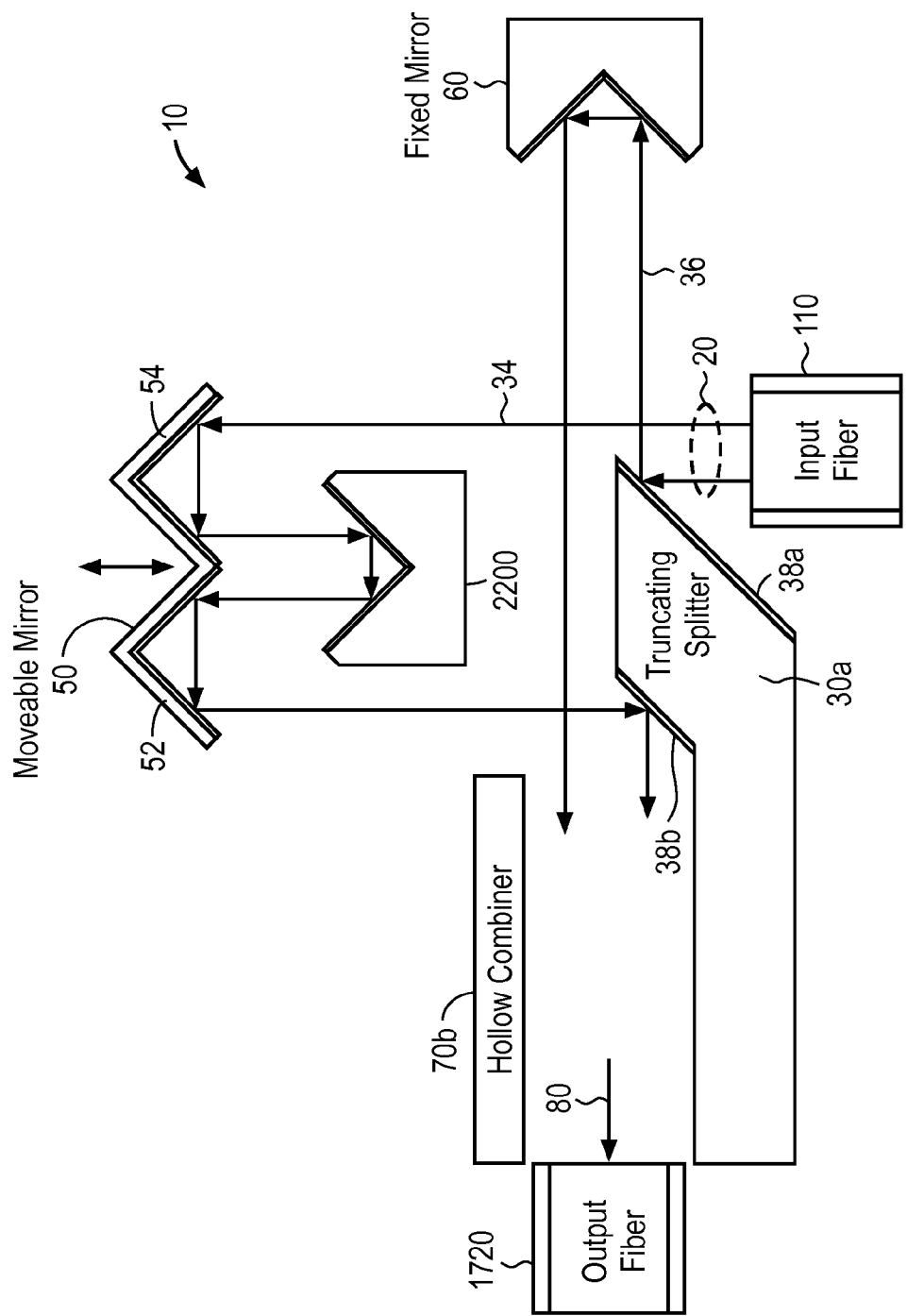

Increasing the optical path difference OPD between the two beams of the interferometer arms may be necessary in some applications. For example, FTIR spectrometers typically require a long OPD to increase the resolution of the measured spectrum. As another example, time domain OCT may require a long OPD for deeper imaging into the tissue. Referring now to FIGS. 22A-22C, OPD in SSB-MI's 10 can be increased by employing an optical path multiplier 2200 in the moveable mirror interferometer arm. The optical path multiplier 2200 shown in FIGS. 22A-22C increases the OPD by multiplying the displacement of the moveable mirror 50 by four.

For example, as shown in FIG. 22A, an input fiber 110 directs an input beam 20 towards a reflecting-type truncating splitter 30b that spatially splits the input beam 20 into the first and second interferometer beams 34 and 36. The second interferometer beam 36 is reflected off a first surface of the truncating splitter 30b towards a fixed corner reflector 60, which reflects the second interferometer beam 36 back towards a second reflecting surface of the truncating splitter 30b for reflection towards a hollow MMI waveguide combiner 70b. The first interferometer beam 34 is reflected off a third reflecting surface of the truncating splitter 30b towards a wide moveable corner reflector 50, where it is reflected through the optical path multiplier 2200 and back to a fourth reflecting surface of the truncating splitter 30b for reflection towards the hollow MMI waveguide combiner 70b.

More specifically, the first interferometer beam 34 is incident near an inner edge of a first reflecting surface of the movable corner reflector 50, and is reflected therefrom to an opposing inner edge of a second reflecting surface of the moveable corner reflector 50. The first interferometer beam 34 is then reflected off the second reflecting surface of the moveable corner reflector 50 to a first reflecting surface of a fixed smaller corner reflector 2200 serving as the optical path multiplier. The first interferometer beam 34 is then reflected to the second reflecting surface of the fixed corner reflector 2200, which reflects the first interferometer beam 34 back to the second surface of the movable corner reflector 50, near an outer edge thereof. This enables the first interferometer beam 34 to be reflected back to the first reflecting surface of the movable corner reflector 50 near the outer edge thereof, and consequently be incident on the fourth reflecting surface of the truncating splitter 30b, which directs the first interferometer beam 34 to the hollow MMI waveguide combiner 70b. The hollow MMI waveguide combiner 70b combines the first and second interferometer beams 34 and 36 to produce an output 80 (i.e., interference pattern) that is directed towards output fiber 1720.

Another SSB-MI 10 design incorporating an optical path multiplier in is shown in FIG. 22B, in which the moveable mirror 50 includes two adjacent corner reflectors 52 and 54. In FIG. 22B, an input fiber 110 directs an input beam 20 towards a hollow MMI waveguide splitter 30c that images the input beam 20 to produce the first and second interferometer beams 34 and 36. A reflecting-type truncating splitter 1700 is positioned at the output of the hollow MMI waveguide splitter 30c to direct the first interferometer beam 34 towards the moveable mirror interferometer arm and the second interferometer beam 36 towards the fixed mirror interferometer arm. The second interferometer beam 36 is reflected from a fixed corner reflector 60 in the fixed mirror interferometer arm back towards the truncating splitter 30b, which reflects the second interferometer beam 36 towards a hollow MMI waveguide combiner 70b.

The first interferometer beam 34 is reflected through both reflecting surfaces of a first corner reflector 52 of the moveable mirror 50 towards a fixed corner reflector 2200 serving as the optical path multiplier. The first interferometer beam 34 is then reflected to a second corner reflector 54 of the moveable mirror 50, which reflects the first interferometer beam 34 back towards the truncating splitter 30b for reflection to the hollow MMI waveguide combiner 70b. The hollow MMI waveguide combiner 70b combines the first and second interferometer beams 34 and 36 to produce an output 80 (i.e., interference pattern) that is directed towards output fiber 1720.

FIG. 22C illustrates another SSB-MI 10 design incorporating an optical path multiplier. In FIG. 22C, an input fiber 110 directs an input beam 20 towards a reflection/transmission-type truncating splitter 30a that spatially splits the input beam 20 into the first and second interferometer beams 34 and 36. The second interferometer beam 36 is reflected from a front reflecting surface 38a of the truncating splitter 30a towards a fixed corner reflector 60. The fixed corner reflector 60 reflects the second interferometer beam 36 back towards the truncating splitter 30a and to a hollow MMI waveguide combiner 70b.

The first interferometer beam 34 is directed to a moveable mirror 50 including two adjacent corner reflectors 52 and 54. The first interferometer beam 34 is reflected through both reflecting surfaces of a first corner reflector 54 of the moveable mirror 50 towards a fixed corner reflector 2200 serving as the optical path multiplier. The first interferometer beam 34 is then reflected to a second corner reflector 52 of the moveable mirror 50, which reflects the first interferometer beam 34 towards a back reflecting surface 38b of the truncating splitter 30b for reflection to the hollow MMI waveguide combiner 70b. The hollow MMI waveguide combiner 70b combines the first and second interferometer beams 34 and 36 to produce an output 80 (i.e., interference pattern) that is directed towards output fiber 1720. It should be understood that in any of the embodiments described with respect to FIGS. 22A-22C, the multiplication factor can be extended by adding more cascaded corner cube mirrors to the moveable mirror and optical path multiplier.

As mentioned above, each of the SSB-MI 10 designs shown in FIGS. 11-22C may be fabricated using Micro-Electro-Mechanical System (MEMS) technology that enables a MEMS motor (actuator) to be fabricated on the same substrate using the same fabrication steps, thus leading to an integrated monolithic system. Such a monolithic system provides lithographic alignment of optical components without the need for any alignment modules. In an exemplary embodiment, a single lithography step, together with Deep Reactive Ion Etching (DRIE) is used to fabricate the monolithic system on a Silicon-On-Insulator (SOI) wafer.

Figure 23A:
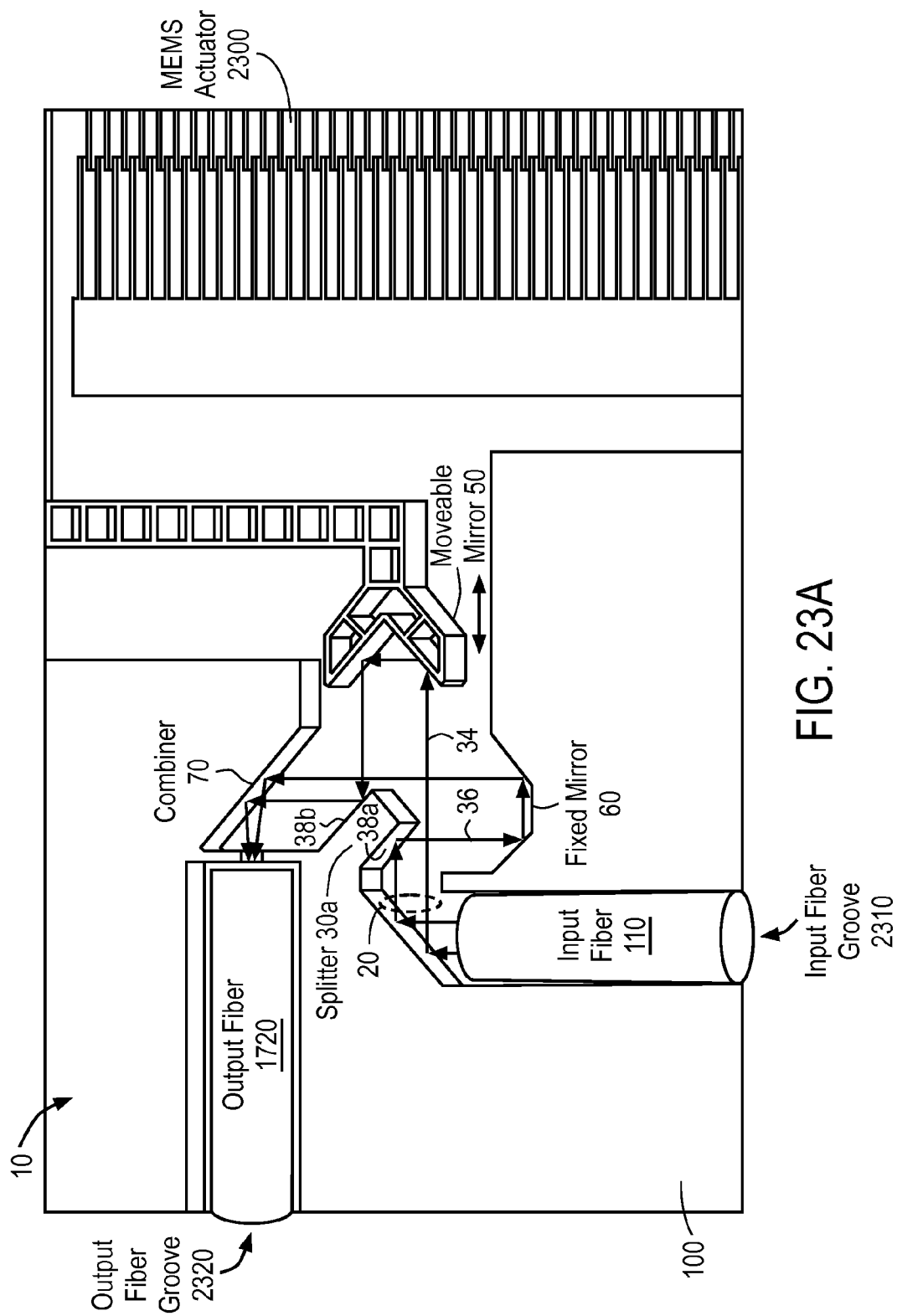
FIGS. 23A and 23B illustrate exemplary fabricated SSB-MIs, in accordance with embodiments of the present invention.
Figure 23B:
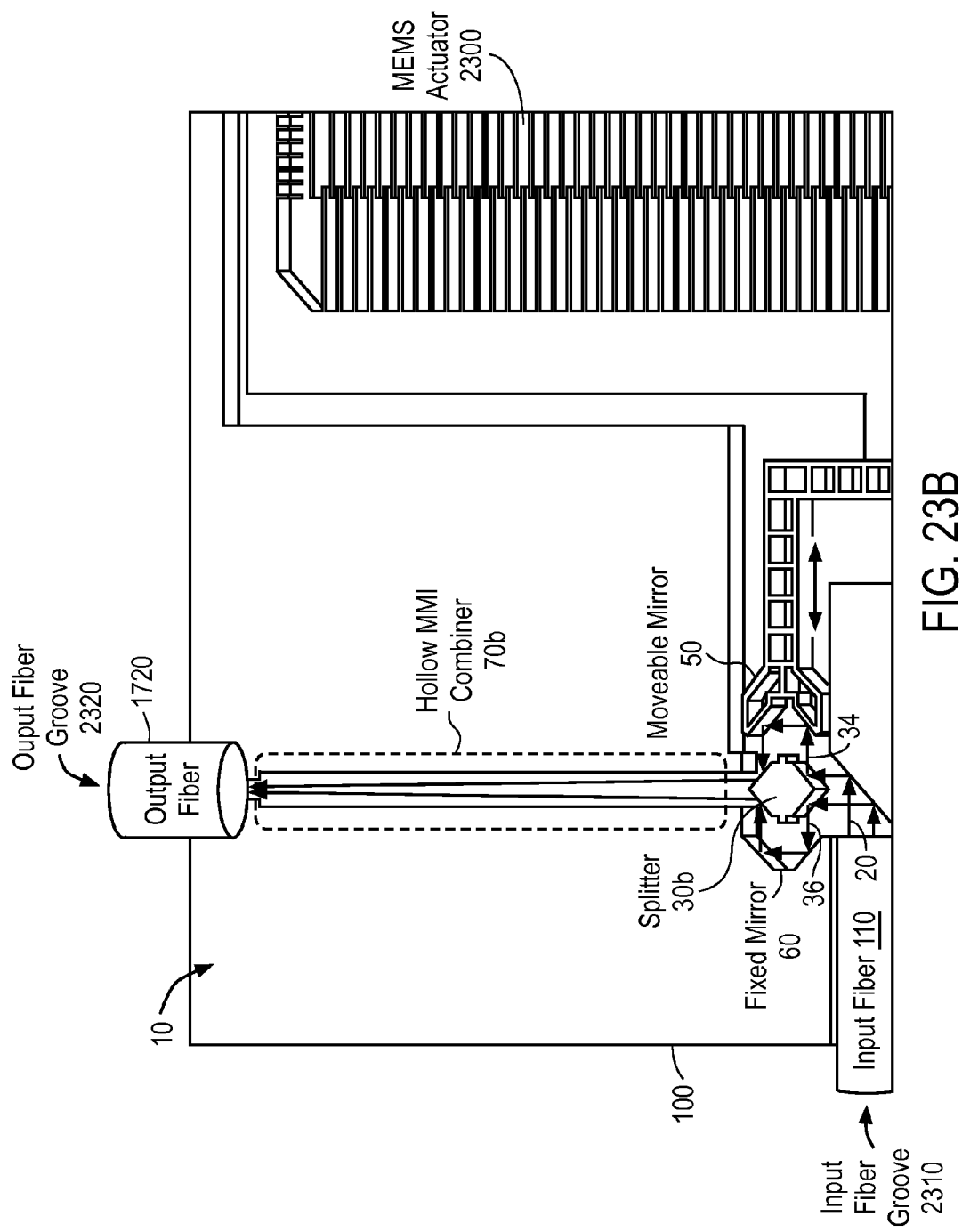

FIGS. 23A and 23B illustrate two exemplary fabricated monolithic systems including SSB-MIs 10. Each monolithic system is shown fabricated on an SOI wafer 100 using a single lithography pattern and DRIE to form various features, such as spatial splitter 30, spatial combiner 70, fixed mirror 60, moveable mirror 50, MEMS actuator 2300, input fiber groove 2310 and output fiber groove 2320.

In the exemplary monolithic system shown in FIG. 23A, an input fiber 110 is shown inserted into the input fiber groove 2310 for providing an input beam 20 into the SSB-MI 10. The input beam 20 is directed towards a reflection/transmission-type truncating splitter 30a that spatially splits the input beam 20 into the first and second interferometer beams 34 and 36. The second interferometer beam 36 is reflected from a front reflecting surface 38a of the truncating splitter 30a towards a fixed corner reflector 60. The fixed corner reflector 60 reflects the second interferometer beam 36 past the truncating splitter 30a towards a combiner 70, which is shown in FIG. 23A as a flat angled reflecting surface.

The first interferometer beam 34 is directed to a moveable mirror 50 (moveable corner reflector). The moveable mirror 50 reflects the first interferometer beam 34 towards a backside of the truncating splitter 30b (back reflecting surface 38b) for reflection to the combiner 70. The combiner 70 combines the first and second interferometer beams 34 and 36 towards output fiber 1720 inserted into output fiber groove 2320. An optical path difference (OPD) between the two interferometer beams 34 and 36 is introduced through motion of the moveable mirror 50 by MEMS actuator 2300. As shown in FIG. 23A, the moveable mirror 50 is coupled to the MEMS actuator 2300, such that motion of the MEMS actuator 2300 causes a displacement in the position of the moveable mirror 50, thereby creating an OPD between the two interferometer beams 34 and 36. The MEMS actuator 2300 may be, for example, an electrostatic actuator, such as a comb drive actuator, parallel plate actuator or other type of actuator, the former being illustrated.

FIG. 23B illustrates another exemplary monolithic system. In FIG. 23B, an input fiber 110 is shown inserted into the input fiber groove 2310 for providing an input beam 20 into the SSB-MI 10. The input beam 20 is directed towards a reflection-type truncating splitter 30a that spatially splits the input beam 20 into the first and second interferometer beams 34 and 36. The second interferometer beam 36 is reflected from a first reflecting surface of the truncating splitter 30a towards a fixed corner reflector 60. The fixed corner reflector 60 reflects the second interferometer beam 36 back towards a second reflecting surface of the truncating splitter 30a, which then reflects the second interferometer beam 36 towards a combiner 70b, which is shown in FIG. 23B as a hollow MMI waveguide combiner.

The first interferometer beam 34 is reflected from a third reflecting surface of the truncating splitter towards a moveable mirror 50 (moveable corner reflector). The moveable mirror 50 reflects the first interferometer beam 34 towards a fourth reflecting surface of the truncating splitter 30b for reflection to the combiner 70b. The combiner 70b combines the first and second interferometer beams 34 and 36 towards output fiber 1720 inserted into output fiber groove 2320. An optical path difference (OPD) between the two interferometer beams 34 and 36 is introduced through motion of the moveable mirror 50 by MEMS actuator 2300.

Figure 24A:
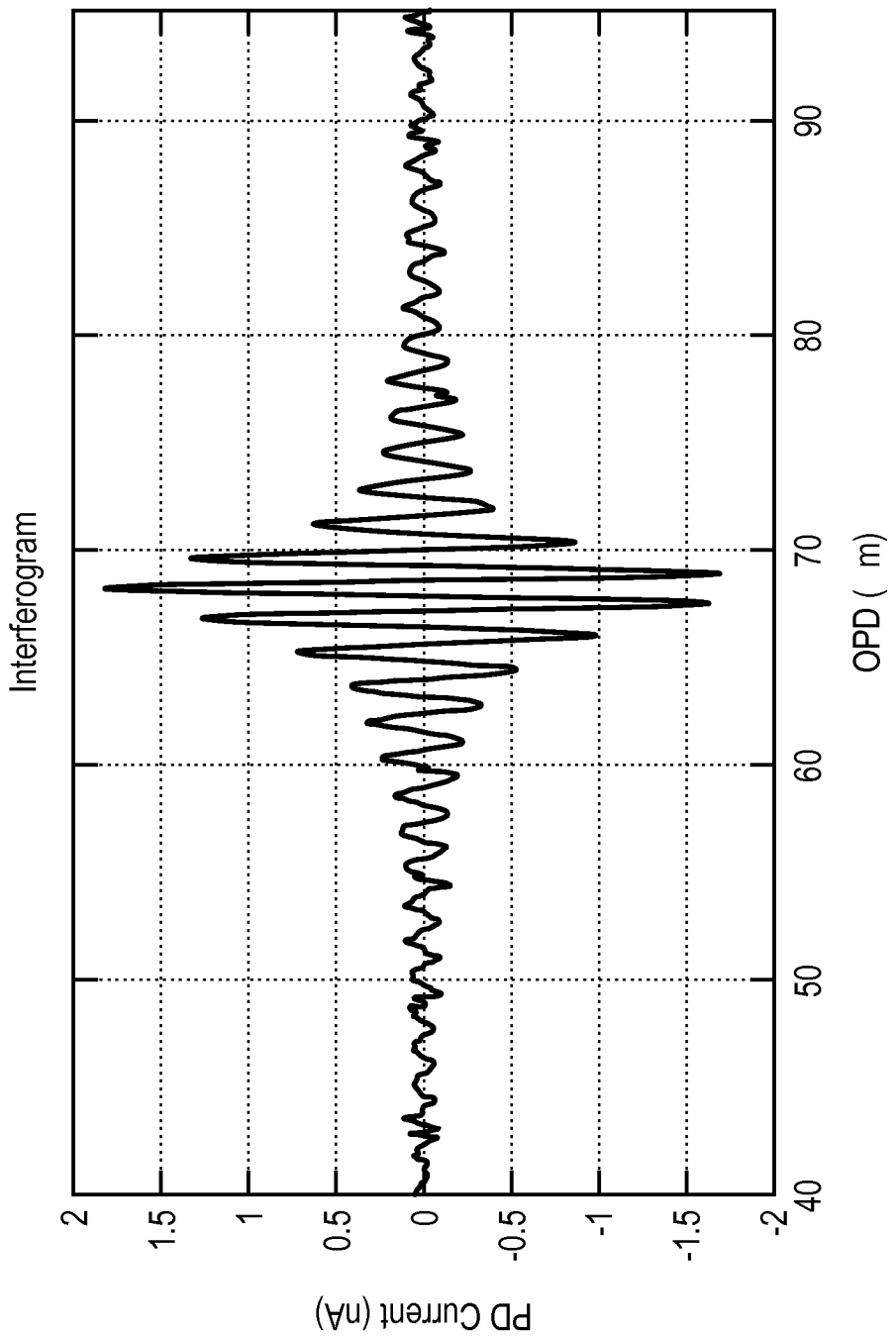
FIGS. 24A-24C illustrate exemplary measurements of an interferometer including an SSB-MI fabricated in accordance with embodiments of the present invention.
Figure 24B:
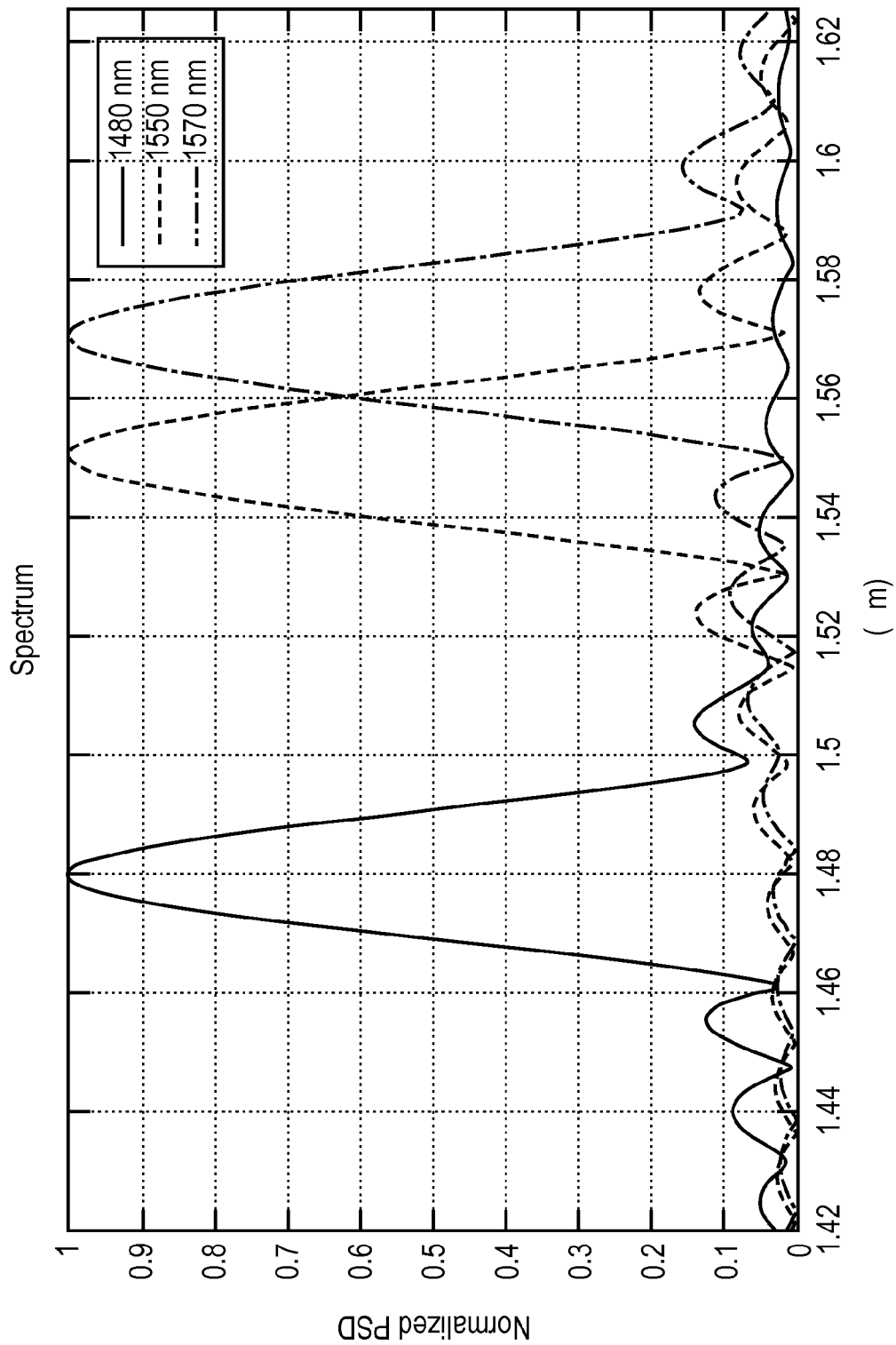
Figure 24C:
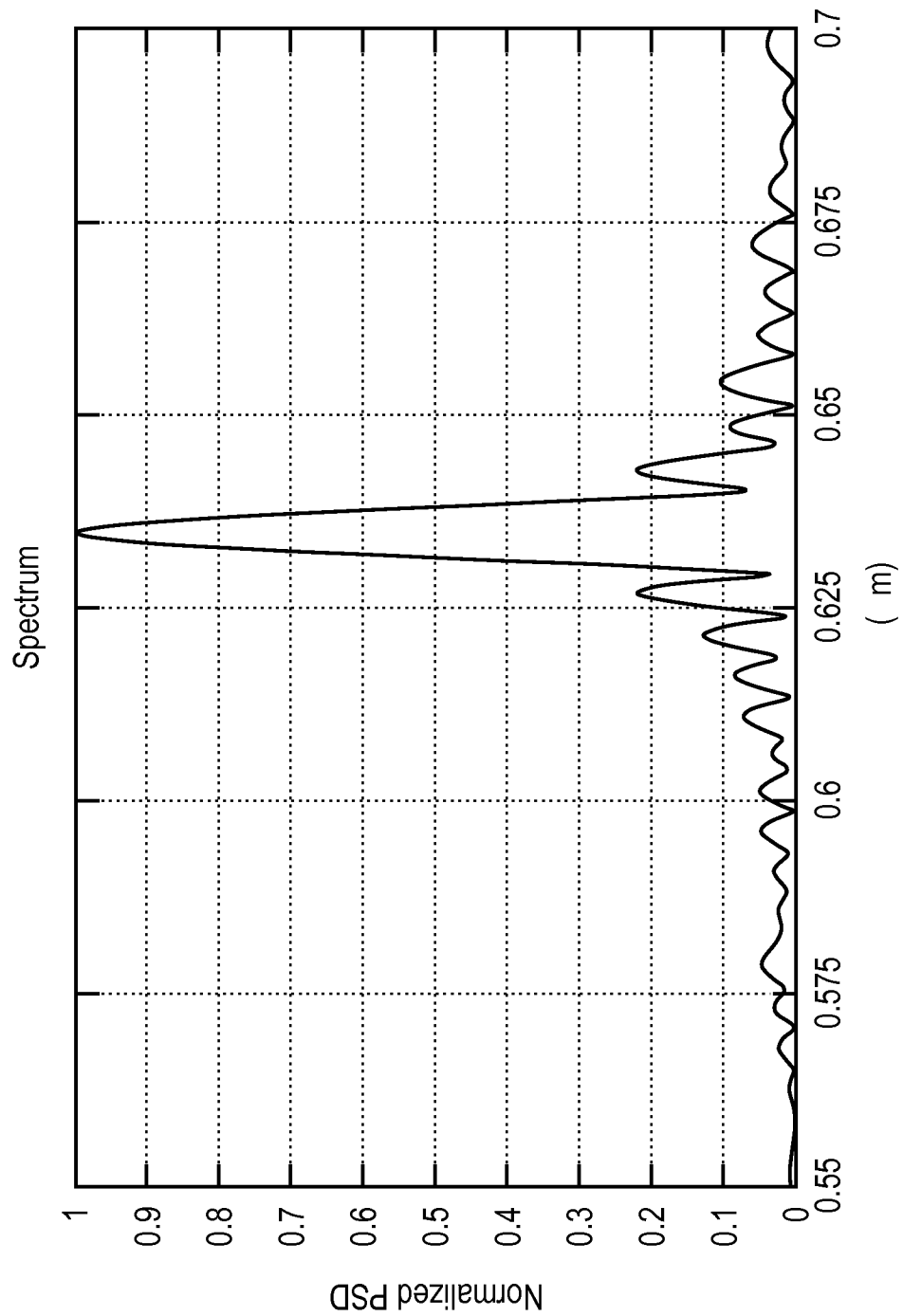

FIGS. 24A-24C illustrate exemplary measurements of an interferometer including an SSB-MI fabricated in accordance with embodiments of the present invention. In particular, the interferometer shown in FIG. 23B was measured using different light sources. When a white infrared source was injected, an interferogram signal with center burst (cosine function with sinc envelope) was measured, as shown in FIG. 24A. In FIG. 24B, the measured spectra of different laser wavelengths in the near infrared are shown. In FIG. 24C, the measured spectrum of a visible red laser at 635 nm is shown.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. An optical Micro Electro-Mechanical Systems (MEMS) interferometer, comprising:
 a spatial splitter optically coupled to receive an input beam and operable to spatially split the input beam into first and second interferometer beams without propagation of either of the first and second interferometer beams within a medium forming the spatial splitter, the spatial splitter further for directing the first interferometer beam towards a first interferometer arm and the second interferometer beam towards a second interferometer arm;
 a spatial combiner optically coupled to the first interferometer arm to receive the first interferometer beam and the second interferometer arm to receive the second interferometer beam and operable to spatially combine the first and second interferometer beams to produce an output;
 a moveable mirror within the second interferometer arm and optically coupled to receive the second interferometer beam and to reflect the second interferometer beam towards the spatial combiner; and
 a MEMS actuator coupled to the moveable mirror to cause a displacement of the moveable mirror thereby producing an optical path difference between the first interferometer beam and the second interferometer beam;
 wherein each of the input beam, the first and second interferometer beams and the output beam propagate within a propagation medium that is different from a spatial splitter medium of the spatial splitter and a spatial combiner medium of the spatial combiner;
 wherein the spatial splitter, the spatial combiner, the moveable mirror and the MEMS actuator are monolithically integrated over a same substrate.

2. The optical MEMS interferometer of claim 1, further comprising:
 a detector optically coupled to receive the output from the spatial combiner and operable to detect an interference pattern produced as a result of interference between the first interferometer beam and the second interferometer beam.

3. The optical MEMS interferometer of claim 1, wherein the spatial splitter includes a truncating splitter having at least one reflecting surface oriented at a non-orthogonal angle with respect to a propagation direction of the input beam such that at least one of the first and second interferometer beams is reflected therefrom.

4. The optical MEMS interferometer of claim 3, wherein:
 the at least one reflecting surface includes an inclined reflecting surface;
 a first portion of the input beam propagates past the truncating splitter without being incident thereon to form the second interferometer beam; and
 a second portion of the input beam is reflected from the inclined reflecting surface of the truncating splitter to form the first interferometer beam.

5. The optical MEMS interferometer of claim 4, wherein the at least one reflecting surface further includes a second reflecting surface optically coupled to receive the second interferometer beam reflected from the moveable mirror and to reflect the second interferometer beam towards the spatial combiner.

6. The optical MEMS interferometer of claim 3, wherein the at least one reflecting surface includes a first reflecting surface and a second reflecting surface, each oriented with respect to the propagation direction of the input beam such that a first portion of the input beam is reflected from the first reflecting surface to form the first interferometer beam and a second portion of the input beam is reflected from the second reflecting surface to form the second interferometer beam.

7. The optical MEMS interferometer of claim 6, wherein the first and second reflecting surfaces are coupled at a shared edge thereof, the truncating splitter being positioned such that the shared edge is aligned to receive at least a portion of a center of the input beam.

8. The optical MEMS interferometer of claim 3, wherein a splitting ratio between the first and second interferometer beams is controlled by a position of a center of the input beam with respect to the at least one reflecting surface.

9. The optical MEMS interferometer of claim 1, wherein the spatial splitter includes a hollow Multi-Mode interference (MMI) waveguide for producing the first and second interferometer beams.

10. The optical MEMS interferometer of claim 9, wherein the MMI waveguide has a length with a distance that enables replication of the input beam into the first and second interferometer beams, each having half beam power of the input beam.

11. The optical MEMS interferometer of claim 9, wherein the spatial splitter further includes:
a reflector splitter optically coupled to receive the first and second interferometer beams and operable to reflect the first interferometer beam towards the first interferometer arm and the second interferometer beam towards the second interferometer arm.

12. The optical MEMS interferometer of claim 9, wherein the MMI waveguide is a butterfly MMI waveguide.

13. The optical MEMS interferometer of claim 9, wherein the MMI waveguide has a length with a parabolic width.

14. The optical MEMS interferometer of claim 1, wherein the spatial splitter includes a slotted splitter having a slotted surface including slots through which one of the first and second interferometer beams is transmitted, the other of the first and second interferometer beams being reflected from the slotted surface.

15. The optical MEMS interferometer of claim 14, wherein the spatial combiner includes the slotted splitter, such that slots of the spatial combiner are oriented at an angle with respect to a direction of slots of the spatial splitter.

16. The optical MEMS interferometer of claim 1, wherein the spatial splitter includes a Y-splitter that gradually spatially splits the input beam into the first and second interferometer beams.

17. The optical MEMS interferometer of claim 1, wherein the spatial combiner includes a focusing element for focusing the first and second interferometer beams to produce the output.

18. The optical MEMS interferometer of claim 1, wherein the spatial combiner includes a hollow MMI waveguide for producing the output from the first and second interferometer beams.

19. The optical MEMS interferometer of claim 1, wherein the spatial combiner includes a slotted combiner having a slotted surface including slots through which one of the first and second interferometer beams is transmitted, the other of the first and second interferometer beams being reflected from the slotted surface and combined therewith to produce the output.

20. The optical MEMS interferometer of claim 1, wherein the spatial combiner includes a double slit combiner having a first slit for receiving the first interferometer beam and a second slit for receiving the second interferometer beam, the double slit combiner enabling interference of selected parts of the first and second interferometer beams after diffraction through the first and second slits.

21. The optical MEMS interferometer of claim 1, wherein the spatial combiner includes a Y-combiner having first and second branches and an output port, the Y-combiner gradually guiding the first interferometer beam along the first branch and the second interferometer beam along the second branch and combining the first and second interferometer beams at the output port.

22. The optical MEMS interferometer of claim 1, further comprising:
a silicon on insulator (SOI) wafer;
wherein the spatial splitter, spatial combiner, moveable mirror and MEMS actuator are simultaneously photolithographically defined on the SOI wafer to provide for monolithic integration thereof.

23. The optical MEMS interferometer of claim 1, further comprising:
a fixed mirror within the first interferometer arm and optically coupled to receive the first interferometer beam and to reflect the first interferometer beam towards the spatial combiner.

24. The optical MEMS interferometer of claim 23, wherein the fixed mirror and the moveable mirror are vertical Bragg mirrors.

25. The optical MEMS interferometer of claim 23, wherein at least one of the fixed mirror and the moveable mirror is a corner reflector.

26. The optical MEMS interferometer of claim 25, wherein the moveable mirror includes two corner reflectors and further comprising:
an optical path multiplier including an additional fixed corner reflector oriented with respect to the moveable mirror to reflect the second interferometer beam between the two corner reflectors of the moveable mirror thereby increasing the optical path difference between the first and second interferometer beams.

27. The optical MEMS interferometer of claim 25, wherein:
each of the fixed mirror and the moveable mirror are corner reflectors;
the spatial splitter includes a first part and a second part;
the first part is optically coupled to receive the input beam, spatially split the input beam into the first and second interferometer beams, direct the first interferometer beam towards the fixed mirror and direct the second interferometer beam towards the moveable mirror;
the fixed mirror is optically coupled to reflect the first interferometer beam towards the second part of the spatial splitter;
the moveable mirror is optically coupled to reflect the second interferometer beam towards the second part of the spatial splitter; and
the second part is optically coupled to reflect the first and second interferometer beams and direct the first and second interferometer beams towards the spatial combiner.

28. The optical MEMS interferometer of claim 1, wherein:
the spatial splitter has a rhombus shape;
the first part of the spatial splitter including first and second reflecting surfaces coupled at a first shared edge thereof that is oriented with respect to the input beam to receive at least a portion of a center of the input beam; and
the second part of the spatial splitter including third and fourth reflecting surfaces coupled at a second edge thereof opposite the first edge.

29. The optical MEMS interferometer of claim 1, further comprising:
an input fiber groove optically coupled to provide the input beam to the spatial splitter; and
an output fiber groove optically coupled to receive the output from the combiner.

30. The optical MEMS interferometer of claim 1, wherein the input beam is provided by an infrared laser source, a visible laser source or a white light source.

31. The optical MEMS interferometer of claim 1, further comprising:
  a focusing element optically coupled to receive the input beam and focus the input beam on the spatial splitter.

* * * * *